US012626071B2

(12) United States Patent
Bender et al.

(10) Patent No.: US 12,626,071 B2
(45) Date of Patent: May 12, 2026

(54) GENERATING SUMMARIES OF TEXTS USING LARGE LANGUAGE MODELS SELECTED BASED ON A MINIMIZATION OF A CLASSIFICATION SCORE, PROCESSING AND READING TIMES AND WORDS IN A DENY LIST

(71) Applicant: Sorcero, Inc., Washington, DC (US)

(72) Inventors: Walter Bender, Newton, MA (US); Nithi Vivatrat, Washington, DC (US); Richard Graves, Washington, DC (US); Tomá Valena, Basel (CH); David McMinn, East Kilbride (GB)

(73) Assignee: Sorcero, Inc., Washington, DC (US)

( * ) Notice: Subject to any disclaimer, the term of this patent is extended or adjusted under 35 U.S.C. 154(b) by 0 days.

(21) Appl. No.: 18/962,575

(22) Filed: Nov. 27, 2024

(65) Prior Publication Data

US 2025/0173523 A1 May 29, 2025

Related U.S. Application Data

(60) Provisional application No. 63/603,944, filed on Nov. 29, 2023.

(51) Int. Cl.
*G06F 40/42* (2020.01)
*G06F 3/0484* (2022.01)
(Continued)

(52) U.S. Cl.
CPC ............ *G06F 40/42* (2020.01); *G06F 18/241* (2023.01); *G06F 3/0484* (2013.01); *G06F 16/332* (2019.01); *G06F 16/34* (2019.01); *G06F 40/157* (2020.01); *G06F 40/205* (2020.01); *G06N 5/01* (2023.01); *G06N 5/04* (2013.01); *G06Q 10/103* (2013.01)

(58) Field of Classification Search
CPC .......... G06N 5/01; G06N 5/04; G06F 3/0484; G06F 40/157; G06F 16/332; G06F 40/42; G06F 16/34; G06F 40/205; G06F 40/35; G06Q 10/103
USPC .......................................... 715/254; 705/7.12
See application file for complete search history.

(56) References Cited

U.S. PATENT DOCUMENTS 8,738,414 B1 * 5/2014 Nagar .................. G06Q 10/103 705/7.12
10,496,272 B1 * 12/2019 Lonkar .................... G06N 5/04
(Continued)

FOREIGN PATENT DOCUMENTS

CN 117194653 * 8/2013 ........... G06F 16/332
KR 2640471 B1 * 8/2023
KR 102640449 * 8/2023 ............. G06F 16/34

*Primary Examiner* — Farzad Kazeminezhad
(74) *Attorney, Agent, or Firm* — Foley & Lardner LLP

(57) ABSTRACT

Systems and methods for generating summaries from text using a generative model are disclosed. The system is configured to access an article; identify section; provide, to one or more generative models, a prompt including instructions to generate a section summary; generate an article summary based on the section summary; determine, from the article summary, a first concept found in the article summary that is missing from the article; determine, using a classifier, for a first sentence included in the article summary, a confidence score; and provide, for presentation at a client device, a document including the article summary.

27 Claims, 5 Drawing Sheets

(51) Int. Cl.

| | |
|---|---|
| ***G06F 16/332*** | (2025.01) |
| ***G06F 16/34*** | (2025.01) |
| ***G06F 18/241*** | (2023.01) |
| ***G06F 40/157*** | (2020.01) |
| ***G06F 40/205*** | (2020.01) |
| ***G06N 5/01*** | (2023.01) |
| ***G06N 5/04*** | (2023.01) |
| ***G06Q 10/10*** | (2023.01) |

(56) References Cited

U.S. PATENT DOCUMENTS

| | | | | |
|---|---|---|---|---|
| 2020/0065387 | A1* | 2/2020 | Matthews | G06F 3/0484 |
| 2023/0107640 | A1 | 4/2023 | Pang et al. | |
| 2023/0252225 | A1* | 8/2023 | Zhelezniak | G06N 5/01 715/254 |
| 2024/0412004 | A1* | 12/2024 | Manikandan | G06F 40/157 |
| 2025/0005276 | A1* | 1/2025 | Bhat | G06F 40/35 |

* cited by examiner

200

202 — ACCESS AN ARTICLE

204 — DETERMINE SECTION IDENTIFIER AND CONFIDENCE SCORE

206 — PROVIDE A PROMPT INCLUDING INSTRUCTIONS TO GENERATE SECTION SUMMARY

208 — DETERMINE THAT A SENTENCE OF A FIRST SECTION HAS A CLASSIFICATION SCORE INDICATING THE SENTENCE BELONGS TO A SECOND SECTION

210 — REMOVE THE SENTENCE FROM THE FIRST SECTION

212 — GENERATE AN ARTICLE SUMMARY FROM THE SECTION SUMMARY

214 — DETERMINE A FIRST CONCEPT IN THE ARTICLE SUMMARY MISSING FROM THE ARTICLE

216 — DETERMINE A CONFIDENCE SCORE INDICATING A LIKELIHOOD THAT THE SENTENCE IS NOT SUPPORTED BY THE ARTICLE

218 — PROVIDE A DOCUMENT INCLUDING THE ARTICLE SUMMARY, A FIRST INDICATOR, AND A SECOND INDICATOR

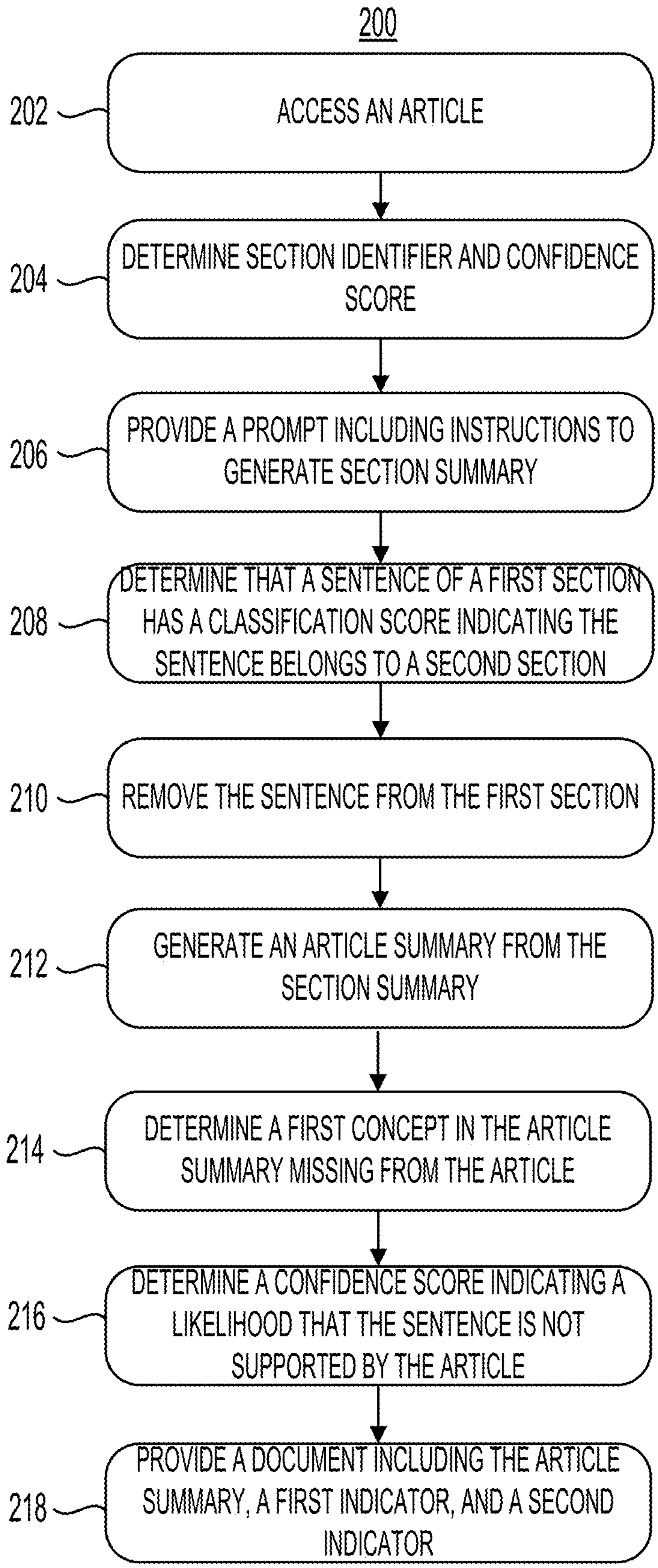

FIG. 2

GENERATING SUMMARIES OF TEXTS USING LARGE LANGUAGE MODELS SELECTED BASED ON A MINIMIZATION OF A CLASSIFICATION SCORE, PROCESSING AND READING TIMES AND WORDS IN A DENY LIST

CROSS-REFERENCE TO RELATED APPLICATION

This application claims the benefit of and priority to U.S. Provisional Patent Application No. 63/603,944, filed on Nov. 29, 2023, the disclosure of which is incorporated herein by reference in its entirety.

BACKGROUND

For regulatory and other purposes, complex texts such as clinical study reports (CSR) are summarized. Human generation of summaries is time-consuming and requires expertise. Machine generation of such summaries can be computationally expensive, due to processing the text using a large language model. Large language models can be subject to extreme latency and hallucinations when fed a large amount of complex text, such as a CSR. Therefore, it is challenging to appropriately create inputs for a large language model and validate the outputs to summarize complex texts.

SUMMARY

The present disclosure relates to one or more systems and methods for summarizing text using a large language model. The data processing system described herein can retrieve an article, determine if the article includes relevant sections such as an abstract and title, identify classifications for the article, generate prompts for the article based on sentences in the article, identify acronyms within the article, generate summaries according to the prompts and using a large language model, filter the summaries to remove hallucinations, and provide a document including an article summary. The systems and methods can generate plain-language summaries of scientific content, such as CSRs, at a reading level lower than that of the source content, enabling easier comprehension and consequently allowing the summaries to reach a broader segment of the population. Generation of summaries from complicated texts such as CSRs involves several technological challenges. Large language models are unable to take large texts as inputs, and if they can, the large text causes extreme latency issues. Furthermore, texts are generally unstructured, thereby adding increased complexity to any data extraction or generative artificial intelligence techniques. Additionally, large language models can introduce hallucinations. By creating curated inputs from the text, the systems and methods described herein can reduce computational expense, such as time, bandwidth, and processing power, when using a large language model.

The systems and methods of this technical solution solves these and other issues by implementing a series of classifications, scores, and prompts to create an input for the large language model. This reduces latency and power consumption while also providing an accurate technical summary of a complex text at a lower reading level. Furthermore, the systems and methods described herein implement a series of filters, both before and after the generation of the summary, to remove hallucinations introduced by the large language model, such as concepts not found in the article or conclusions not reached. This technical solution involves an alignment of content sections of the complex text to the appropriate prompts and validation. In this way, an accurate, fast, and simplified summary of a complex text can be generated from a large language model.

At least one aspect relates to a system. The system can include one or more processors coupled to memory. The one or more processors can be configured to access an article including a title and a body. The one or more processors can identify, from the article, a plurality of sections. The one or more processors can provide, to one or more generative models, for each section of the set of sections of the article, a prompt. The prompt can include instructions to generate a section summary for the section based on the one or more sentences included in the section. The one or more processors can generate an article summary based on the section summary generated for each section and an updated section summary of a first section. The one or more processors can determine, from the article summary, a first concept found in the article summary that is missing from the article. The one or more processors can determine, using a classifier, for a first sentence included in the article summary, a confidence score indicating a likelihood that the first sentence is not supported by the article. The one or more processors can provide, for presentation at a client device, a document including the article summary, a first indicator corresponding to the first concept, and a second indicator corresponding to the first sentence.

In some embodiments, the classifier can be a first classifier. The one or more processors can determine, using the first classifier, that at least one sentence included in a section summary of a first section of the set of sections of the article has a classification score indicating that the at least one sentence belongs to a second section of the set of sections of the article. The one or more processors can remove the at least one sentence from the section summary of the first section to generate an updated section summary of the first section. The one or more processors can generate the article summary based on the section summary generated for each section and the updated section summary of the first section.

In some embodiments, the one or more processors can determine, responsive to determining the confidence score indicating the likelihood that the first sentence is not supported by the evidence in the article, a score indicating a reading level for the article summary. The one or more processors can provide, for presentation at the client device, the document including the score. In some embodiments, the one or more processors can determine, responsive to determining the confidence score indicating the likelihood that the first sentence is not supported by the evidence in the article, a period of time indicating a duration a user associated with the client device is reading for each of the article summary and the article. The one or more processors can provide, for presentation at the client device, the document including the period of time.

In some embodiments, providing the document can include the one or more processors to identify a deny list of words associated with the article. The one or more processors can parse the article summary to identify a first word of the deny list appearing within the article summary. The one or more processors can replace the first word appearing within the article summary with a second word based on an index mapping the deny list of words to an allow list of words. In some embodiments, the one or more processors can determine, responsive to determining the section identifier and the confidence score for each sentence, that a first confidence score for a sentence is above a threshold confidence score. The one or more processors can associate the sentence with the section identifier corresponding to the first confidence score. The one or more processors can determine that a second confidence score for a second sentence is at or below the threshold confidence score. The one or more processors can associate the second sentence with a second section identifier different than the section identifier associated with the second confidence score.

In some embodiments, the classifier can include a first classifier and a second classifier. The one or more processors can train the first classifier using a set of bodies from a set of articles to recognize a set of section identifiers. The one or more processors can train the second classifier using a set of sentences of a set of section summaries and the set of bodies to compare the set of sentences to the set of bodies. In some embodiments, providing a prompt to the one or more generative models can include the one or more processors to select the one or more generative models from a set of generative models based on the selected one or more generative models providing a higher metric than the non-selected generative models. The metric can be at least one of: a minimization of the classification score; a minimization of processing time; a minimization of a score indicating a duration a user associated with the client device is reading; a minimization of a period of time associated with a reading time; and a minimization of words on a deny list included within the section summaries.

In some embodiments, the one or more processors can determine that the article satisfies a format including the body and the title. The one or more processors can access the article responsive to the determination that the article satisfies the format. In some embodiments, the one or more processors can determine that a second article does not satisfy a format including the body and the title. The one or more processors can provide, for presentation at the client device, an indication of the second article not satisfying the format. In some embodiments, the one or more processors can provide, for presentation at the client device, the document. The document can include a comparison of a first score indicating a reading level associated with the article summary and a second score indicating a reading level associated with the article.

In some embodiments, to identify, from the article, a plurality of sections, the one or more processors can provide, to a generative model, a prompt to cause the generative model to output portions of the body of the article in respective sections of the plurality of sections. In some embodiments, the classifier can include a first classifier. The body can include a plurality of sentences. To identify, from the article, a plurality of sections, the one or more processors can determine, by inputting each sentence of the one or more sentences of the article into the first classifier, a section identifier and a confidence score for each sentence. The confidence score can indicate a likelihood of its respective sentence corresponding to its respective section identifier. In some embodiments, to generate the article summary, the one or more processors can iteratively prompt the generative model based on a threshold associated with the article summary.

At least one aspect relates to a method. The method can include accessing, by one or more processors coupled with memory, an article including a title and a body. The body can include a set of sections. The set of sections can include one or more sentences. The method can include determining, by the one or more processors, by inputting each sentence of the one or more sentences of the article into a first classifier, a section identifier and a confidence score for each sentence. The confidence score can indicate a likelihood of its respective sentence corresponding to its respective section identifier. The method can include providing, by the one or more processors, to one or more generative models, for each section of the set of sections of the article, a prompt. The prompt can include instructions to generate a section summary for the section based on the one or more sentences included in the section. The method can include generating, by the one or more processors, an article summary based on the section summary generated for each section. The method can include determining, by the one or more processors, from the article summary, a first concept found in the article summary that is missing from the article. The method can include determining, by the one or more processors, using a classifier, for a first sentence included in the article summary, a confidence score indicating a likelihood that the first sentence is not supported by the article. The method can include providing, by the one or more processors, for presentation at a client device, a document including the article summary, a first indicator corresponding to the first concept, and a second indicator corresponding to the first sentence.

In some embodiments, the classifier can include a first classifier. The method can include determining, by the one or more processors, using the first classifier, that at least one sentence included in a section summary of a first section of the set of sections of the article has a classification score indicating that the at least one sentence belongs to a second section of the set of sections of the article. The method can include removing, by the one or more processors, the at least one sentence from the section summary of the first section to generate an updated section summary of the first section. The method can include generating, by the one or more processors, an article summary based on the section summary generated for each section.

In some embodiments, the method can include determining, by the one or more processors, responsive to determining the confidence score indicating the likelihood that the first sentence is not supported by evidence in the article, a score indicating a reading level for the article summary. The method can include providing, by the one or more processors, for presentation at the client device, the document including the score. In some embodiments, the method can include determining, by the one or more processors, responsive to determining the confidence score indicating the likelihood that the first sentence is not supported by evidence in the article, a period of time. The period of time can indicate a duration a user associated with the client device is reading for each of the article summary and the article. The method can include providing, by the one or more processors, for presentation at the client device, the document including the period of time.

In some embodiments, providing the document can include identifying, by the one or more processors, a deny list of words associated with the article. Providing the document can include parsing, by the one or more processors, the article summary to identify a first word of the deny list appearing within the article summary. Providing the document can include replacing, by the one or more processors, the first word appearing within the article summary with a second word based on an index mapping the deny list of words to an allow list of words. In some embodiments, the method can include determining, by the one or more processors, responsive to determining the section identifier and the confidence score for each sentence, that a first confidence score for a sentence is above a threshold confidence score. The method can include associating, by the one or more processors, the sentence with the section identifier corresponding to the first confidence score. The method can include determining, by the one or more processors, that a second confidence score for a second sentence is at or below the threshold confidence score. The method can include associating, by the one or more processors, the second sentence with a second section identifier different than the section identifier associated with the second confidence score.

In some embodiments, providing a prompt to the one or more generative models can include selecting, by the one or more processors, the one or more generative models from a set of generative models based on the selected one or more generative models providing a higher metric than the non-selected generative models. The metric can include at least one of: a minimization of the classification score; a minimization of processing time; a minimization of a score indicating a duration a user associated with the client device is reading; a minimization of a period of time associated with a reading time; and a minimization of words on a deny list included within the section summaries.

In some embodiments, the method can include determining, by the one or more processors, that the article satisfies a format including the body and the title. The method can include accessing, by the one or more processors, the article responsive to the determination that the article satisfies the format. In some embodiments, the method can include determining, by the one or more processors, that a second article does not satisfy a format including the body and the title. The method can include providing, by the one or more processors, for presentation at the client device, an indication of the second article not satisfying the format.

In some embodiments, identifying, from the article, the plurality of sections can include providing, to a generative model, a prompt to cause the generative model to output portions of the body of the article in respective sections of the plurality of sections. In some embodiments, the classifier can be a first classifier. In some embodiments, identifying, from the article, the plurality of sections can include determining, by inputting each sentence of the one or more sentences of the article into the first classifier, a section identifier and a confidence score for each sentence. The confidence score can indicate a likelihood of its respective sentence corresponding to its respective section identifier. In some embodiments, generating the article summary can include iteratively prompting the generative model based on a threshold associated with the article summary.

At least one aspect relates to a system. The system can include one or more processors coupled to memory. The one or more processors can be configured to access an article including a title and a body. The one or more processors can identify, from the article, a plurality of sections. The one or more processors can provide, to one or more generative models, for each section of the plurality of sections of the article, a prompt. The prompt can include instructions to generate a section summary for the section based on one or more sentences included in the section. The one or more processors can generate an article summary based on the section summary generated for each section. The one or more processors can determine that a first portion of the article summary does not satisfy a validation criterion. The one or more processors can provide, for presentation at a client device, a document including the article summary and a first indicator corresponding to a first portion of the article.

In some embodiments, the one or more processors can determine, using a first classifier responsive to providing the prompt to generate the section summary for the section, that at least one sentence included in a section summary of a first section of the plurality of sections of the article has a classification score indicating that the at least one sentence belongs to a second section of the plurality of sections of the article. The one or more processors can remove the at least one sentence from the section summary of the first section to generate an updated section summary of the first section. The one or more processors can generate the article summary based on the section summary generated for each section and the updated section summary of the first section.

In some embodiments, to determine that the first portion does not satisfy the validation criteria, the one or more processors can determine, from the article summary, a first concept found in the article summary that is missing from the article. The first indicator can correspond to the first concept.

In some embodiments, to determine that the first portion does not satisfy the validation criteria, the one or more processors can determine, using a second classifier, for a first sentence included in the article summary, a confidence score indicating a likelihood that the first sentence is not supported by the article. The first indicator can correspond to the first sentence.

At least one aspect relates to a non-transitory computer-readable medium. The non-transitory computer-readable medium can include instructions embodied thereon. The instructions can cause one or more processors to access an article including a title and a body including a set of sections including one or more sentences. The instructions can cause one or more processors to determine, by inputting each sentence of the one or more sentences of the article into a first classifier, a section identifier and a confidence score for each sentence. The confidence score can indicate a likelihood of its respective sentence corresponding to its respective section identifier. The instructions can cause one or more processors to provide, to one or more generative models, for each section of the set of sections of the article, a prompt. The prompt can include instructions to generate a section summary for the section based on the one or more sentences included in the section. The instructions can cause one or more processors to determine, using a the first classifier, that at least one sentence included in a section summary of a first section of the set of sections of the article has a classification score indicating that the at least one sentence belongs to a second section of the set of sections of the article. The instructions can cause one or more processors to remove the at least one sentence from the section summary of the first section to generate an updated section summary of the first section. The instructions can cause one or more processors to generate an article summary based on the section summary generated for each section and the updated section summary of the first section. The instructions can cause one or more processors to determine, from the article summary, a first concept found in the article summary that is missing from the article. The instructions can cause one or more processors to determine, using a second classifier, for a first sentence included in the article summary, a confidence score indicating a likelihood that the first sentence is not supported by the article. The instructions can cause one or more processors to provide, for presentation at a client device, a document including the article summary, a first indicator corresponding to the first concept and a second indicator corresponding to the first sentence.

In some embodiments, the instructions can cause one or more processors to determine, responsive to determining the confidence score indicating the likelihood that the first sentence is not supported by the evidence in the article, a score indicating a reading level for the article summary. The instructions can cause one or more processors to provide, for presentation at the client device, the document including the score.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular forms of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 2 illustrates an example flow diagram of a method for summarizing text using a large language model, in accordance with one or more implementations;

DETAILED DESCRIPTION

Below are detailed descriptions of various concepts related to, and implementations of, techniques, approaches, methods, apparatuses, and systems for summarizing text using a large language model. The various concepts introduced above and discussed in greater detail below may be implemented in any of numerous ways, as the described concepts are not limited to any particular manner of implementation. Examples of specific implementations and applications are provided primarily for illustrative purposes. Existing technical solutions that address summarizing text using large language models do not filter hallucinations, provide a simplified summary from a complex text, and require large computational resources.

The systems and methods described herein implement a series of machine learning models, including classifiers and large language models, to generate a summary of a text. Texts such as clinical study reports (CSR) or other complex scientific articles can include verbiage comprehensible only to subject matter experts of the field in which the CSR or other article is about. Plain-language summaries, or simply summaries, of these articles are generated for submission to regulatory, governmental, scientific, and other such bodies. It is desirable to have these summaries in simplified (e.g., "e.g., plain language") vernacular such that a non-subject matter expert can discern the intention of the article. Generation of these summaries using large language models poses multiple technical difficulties, including consumption of excessive computational resources, introduction of hallucinations, and failure to generate a summary simpler than its corresponding article.

The systems and methods described herein solve these technical difficulties by providing a framework by which to produce inputs for the large language models and thereafter validate the output by the large language model. The framework can include one or more machine learning models to determine classifications and scores for subsets of the article based on the text within the article, such as sentences or titles. The systems and methods can identify classifications which are not above or below a threshold and can remove the association of a classification from a subset of the article. The systems and methods can generate summaries for the subsets of the article and the article. Furthermore, the systems and methods can filter and remove hallucinations identified within the summaries by identifying concepts and evidence present in the article. In this manner, the overall processing time for creation of a summary from an article can be greatly reduced, as well as validated and ensured for simplicity.

Figure 1:
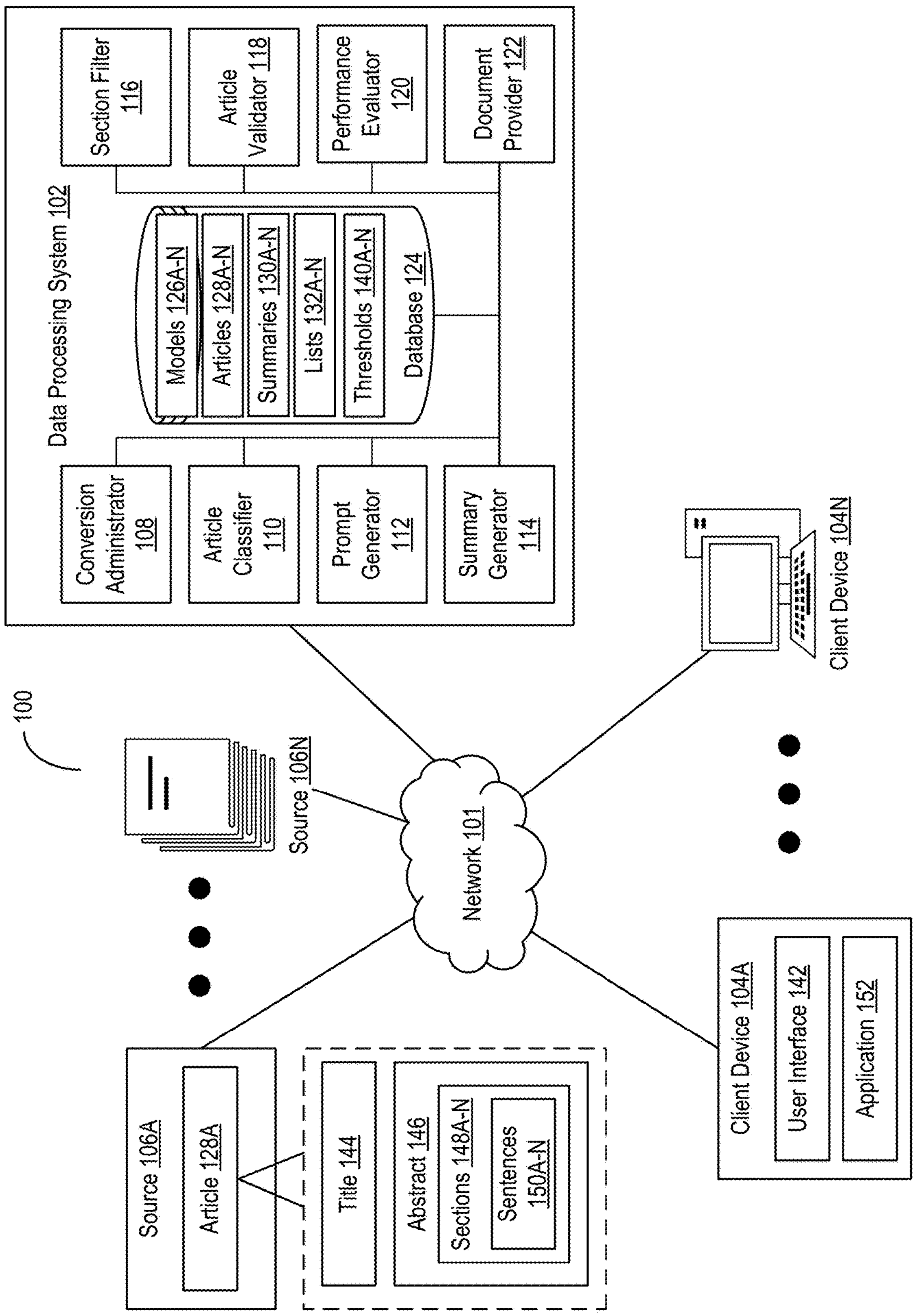
FIG. 1 is a block diagram of an example system for summarizing text using a large language model in accordance with one or more implementations.

Referring now to FIG. 1, illustrated is a block diagram of an example system 100 for generating summaries from texts using large language models. The system 100 can include at least one data processing system 102, at least one network 101, one or more sources 106A-106N (sometimes generally referred to as the source(s) 106), and one or more client devices 104A-104N (sometimes generally referred to as the client device(s) 104). The data processing system 102 can include a conversion administrator 108, an article classifier 110, a prompt generator 112, a summary generator 114, a section filter 116, an article validator 118, a performance evaluator 120, a document provider 122, and at least one database 124. The database 124 can include one or more model 126A-N, articles 128A-N, summaries 130A-N, lists 132A-N, or thresholds 140A-N. Although shown here as internal to the data processing system 102, the database 124 can be external to the data processing system 102, for example, as a part of a cloud computing system or an external computing device in communication with the devices (e.g., the data processing system 102, the client devices 104, etc.) of the system 100 via the network 101.

Figure 4:
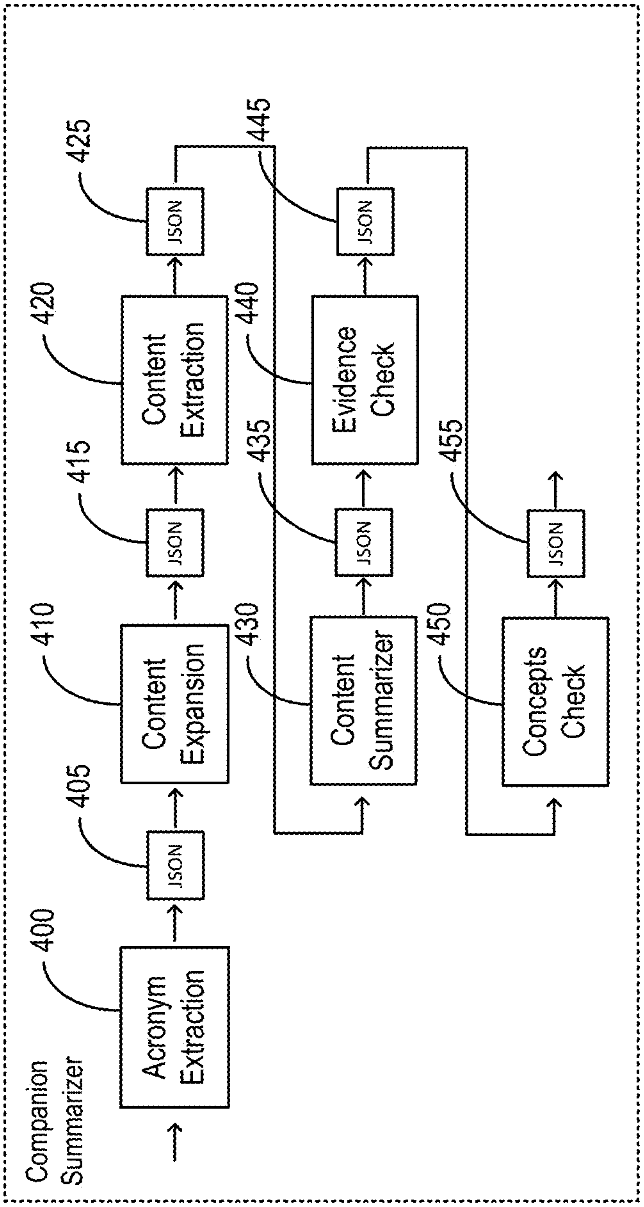
FIG. 4 is an example flow diagram of a method for summarizing text using a large language model to identify acronyms, in accordance with one or more implementations.

Each of the components (e.g., the conversion administrator 108, the article classifier 110, the prompt generator 112, the summary generator 114, the section filter 116, the article validator 118, the performance evaluator 120, the document provider 122, and the database 124, etc.) of the system 100 can be implemented using the hardware components or a combination of software with the hardware components of a computing system, such as the computing system depicted in block diagram 400 detailed herein in conjunction with FIG. 4, or any other computing system described herein. Each of the components of the data processing system 102 can perform the functionalities detailed herein.

The data processing system 102 can include at least one processor and a memory (e.g., a processing circuit). The memory can store processor-executable instructions that, when executed by a processor, cause the processor to perform one or more of the operations described herein. The processor may include a microprocessor, an application-specific integrated circuit (ASIC), a field-programmable gate array (FPGA), a graphics processing unit (GPU), a tensor processing unit (TPU), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 102 can include one or more computing devices or servers that can perform various functions as described herein. The data processing system 102 can include any or all of the components and perform any or all of the functions of the computing devices of block diagram 400 described herein in conjunction with FIG. 4.

In some implementations, the data processing system 102 may communicate with the sources 106, for example, to receive or retrieve the articles 128A-N (hereinafter sometimes referred to as the article(s) 128) from the sources 106. The data processing system 102 may communicate with the client devices 104, for example, to provide and to receive user input, or to provide the summaries 130A-N (hereinafter sometimes referred to as the summary 130 or the summaries 130) via the network 101. In one example, the data processing system 102 can be or can include an application server or webserver, which may include software modules allowing various computing devices (e.g., the client devices 104, or the sources 106 etc.) to access or manipulate data stored by the data processing system 102. For example, the data processing system 102 may include a webserver allowing the client devices 104 to access data that is collected and manipulated by the data processing system 102. For example, user associated with the client device 104A may access the functionality of the data processing system 102 by executing a web browser application and access a website hosted on the webserver in order to access data.

The network 101 can include computer networks such as the Internet, local, wide, metro or other area networks, intranets, satellite networks, other computer networks such as voice or data mobile phone communication networks, or combinations thereof. The data processing system 102 of the system 100 can communicate via the network 101 with one or more computing devices, such as the one or more client devices 104. The network 101 may be any form of computer network that can relay information between the data processing system 102, the one or more client devices 104, and the one or more sources 106. In some implementations, the network 101 may include the Internet and/or other types of data networks, such as a local area network (LAN), a wide area network (WAN), a cellular network, a satellite network, or other types of data networks. The network 101 may also include any number of computing devices (e.g., computers, servers, routers, network switches, etc.) that are configured to receive or transmit data within the network 101.

The network 101 may further include any number of hardwired or wireless connections. Any or all of the computing devices described herein (e.g., the data processing system 102, the one or more client devices 104, the one or more sources 106, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 101. Any or all of the computing devices described herein may also communicate wirelessly with the computing devices of the network 101 via a proxy device (e.g., a router, network switch, or gateway).

Each of the client devices 104 can include at least one processor and a memory (e.g., a processing circuit). The memory can store processor-executable instructions that, when executed by the processor, cause the processor to perform one or more of the operations described herein. The processor can include a microprocessor, an ASIC, an FPGA, a GPU, a TPU, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 104 can include one or more computing devices or servers that can perform various operations as described herein.

Each client device 104 can be a personal computer, a laptop computer, a television device, a smart phone device, a mobile device, or another type of computing device. Each client device 104 can be implemented using hardware or a combination of software and hardware. Each client device 104 can include a user interface 142. The user interface 142 can be a display or display portion. The user interface 142 can include a display portion of a television, a display portion of a computing device, a GUI, or another type of interactive display (e.g., a touchscreen, a display, etc.) and one or more I/O devices (e.g., a mouse, a keyboard, digital keypad). The user interface 142 can present an application 152 executing on the client device 104. The user interface 142 can include a touch screen to display the application 152. The application 152 may be or include a web browser application or a native application, which may be used to access the functionality of the data processing system 102, as described herein.

The user interface 142 can include a touch screen display, which can receive input from a user. The client device 104 may also receive interactions via any other type of I/O device. Each client device 104 can include an input device that couples or communicates with the user interface 142 of each client device 104. Input received via the user interface 142 to interact with the application 152 executing on the client device 104. The application 152 may receive data from the data processing system 102 via the network 101 for display on the user interface 142. The application 152 may transmit data or inputs by a user associated with the client device 104 for transmittal to the data processing system 102.

The application 152 can include a local application (e.g., local to a client device 104), hosted application, a SaaS application, a virtual application, a mobile application, or other forms of content. In some implementations, the application 152 can include or correspond to applications provided by remote servers or third-party servers. In some implementations, the application can access the models 126A-N (hereinafter sometimes referred to as the model(s) 126), the articles 128, the summaries 130, the lists 132A-N (hereinafter sometimes referred to as the list(s) 132), or the thresholds 140A-N (hereinafter sometimes referred to as the threshold(s) 140), and generate one or more interactive user interface elements through the user interface 142. Some example interactive user interface elements include user-selectable hyperlinks, buttons, graphics, videos, images, or other application features. Interactions with such interactive user interface elements can cause the application 152 executing on the respective client device 104 to generate a signal, which can cause the application 152 to perform further operations corresponding to the interaction.

In some implementations, one or more client devices 104 can establish one or more communication sessions with the data processing system 102. A communication session can include a channel or connection between the data processing system 102 and a respective client device 104. The one or more communication sessions can each include an application session (e.g., virtual application), an execution session, a desktop session, a hosted desktop session, a terminal services session, a browser session, a remote desktop session, a URL session or a remote application session. Each communication session can include encrypted or secure sessions, which can include an encrypted file, encrypted data, or traffic.

In some implementations, in response to interactions with corresponding user interface elements, the application 152 executing on a client device 104 can transmit information. For example, the client device 104 can transmit a request to generate a summary 130 of an article 128. In some implementations, the request may include the article 128. For example, the client device 104 can transmit a CSR to the data processing system 102 via the network 101 to initiate the generation of a summary 130 based on the article 128. In some implementations, the request to generate a summary 130 can include information related to the article 128. For example, the request can include a title 144 of the summary, with which the data processing system 102 can search or locate the article 128 from the source 106.

The source 106 can be any external database or server containing one or more articles 128. The source 106 can include research databases, medical databases, external servers including articles, university databases, among others. The source 106 can include one or more computing systems and be configured for communication via the network 101. The sources 106 can include the one or more articles 128. The articles 128 can be any type of text, paper, journal, essay, or paper. For example, the article 128 can include scientific publications, clinical study reports, journal articles, conference notes, or presentation slides. The article 128 can include text, images, figures, charts, graphs, or other such visual displays. In some embodiments, the article 128 includes a title 144 and a body 146. The body 146 can include text or strings formatted into one or more sections 148A-N (hereinafter referred to as the section(s) 148). for example, the body 146 can include a corpus of text, an abstract, a list, a memorandum, etc. Each section 148 of the body 146 may include subject matter (denoted by the text) related to a heading of the section 148. For example, a first section 148A may include text related to a "background" of the article 128 and the section 180A may include a heading of "background" as labelled in the article 128. The one or more sections 148 may include one or more sentences 150A-N (hereinafter referred to as the sentence(s) 150). The sentences 150 can include strings of alphanumeric characters terminated by one or more punctuation marks, including periods, exclamation points, and question marks. In some embodiments, the data processing system 102 can generate summaries 130 based on an article 128.

The summaries 130 can include text generated from the article 128 by the data processing system 102 using the systems and methods described herein. In some embodiments, the summary 130 is an abbreviated text that surmises, abbreviates, or otherwise condenses the subject matter of the article 128 on which it is based. The summary 130 may include a certain character count, line count, word count, or otherwise be restricted in its length, vocabulary, or characters. The summary 130 can be smaller, shorter, or simpler in complexity than its corresponding article 128. For example, a summary 130A may contain 150 words, whereas its corresponding article 128A may contain 200,000 words. For example, a summary 130B may be readable by a 10-year-old, whereas its corresponding article 128B may only be readable by those with a graduate degree in the subject matter of the article 128B. Furthermore, in some embodiments, the article 128 may include images, figures, charts, etc., whereas the summary 130 may contain only text.

In some embodiments, the summary 130 may condense the article 128 to provide an abridged overview of the article 128, such as by answering questions related to who wrote the article, what the article studied, when an experiment discussed in the article occurred, where the article was authored, the purposes of an experiment, the methodology of an experiment, conclusions reached, among other key points covered in the article 128. The summaries 130 can include summaries of individual sections (e.g., section summaries) of the article, a summary of the article 128 in its entirety (e.g., an article summary), or a combination thereof. In some embodiments, the article summary can include the section summaries. The summaries 130 and the articles 128 can be stored in the database 124.

The database 124 can be a computer-readable memory that can store or maintain any of the information described herein. The database 124 can store or maintain one or more data structures, which may contain, index, or otherwise store each of the values, texts, pluralities, sets, variables, vectors, numbers, or thresholds described herein. The database 124 can be accessed using one or more memory addresses, index values, or identifiers of any item, structure, or region maintained in the database 124. The database 124 can be accessed by the components of the data processing system 102, or any other computing device described herein, via the network 101. In some implementations, the database 124 can be internal to the data processing system 102. In some implementations, the database 124 can exist external to the data processing system 102, and may be accessed via the network 101. The database 124 can be distributed across many different computer systems or storage elements, and may be accessed via the network 101 or a suitable computer bus interface. The data processing system 102 can store, in one or more regions of the memory of the data processing system 102, or in the database 124, the results of any or all computations, determinations, selections, identifications, generations, constructions, or calculations in one or more data structures indexed or identified with appropriate values.

Any or all values stored in the database 124 may be accessed by any computing device described herein, such as the data processing system 102, to perform any of the functionalities or functions described herein. In some implementations, a computing device, such as a client device 104, may utilize authentication information (e.g., username, password, email, etc.) to show that the client device 104 is authorized to access requested information in the database 124. The database 124 may include permission settings that indicate which users, devices, or profiles are authorized to access certain information stored in the database 124. In some implementations, instead of being internal to the data processing system 102, the database 124 can form a part of a cloud computing system. In such implementations, the database 124 can be a distributed storage medium in a cloud computing system and can be accessed by any of the components of the data processing system 102, by the one or more client devices 104, the one or more sources 106, or any other computing devices described herein.

The conversion administrator 108 may access the source 106 to retrieve the article 128 for storage in the database 124. The conversion administrator 108 may access the article 128A responsive to the request from the client device 104 to generate a summary 130A for the article 128A. The conversion administrator 108 may search the one or more sources 106 for the title 144, the body 146, a location of the article 128, or other identifying information of the article 128 indicated in the request. The conversion administrator 108 may download the article 128 from the source 106, or the source 106 may provide the article 128 to the conversion administrator 108. In some embodiments, the request can include the article 128. The conversion administrator 108 can receive the article 128 in a variety of file formats, including as a document (e.g., DOCX or DOC), portable digital file (PDF), text (TXT), comma separated values (CSV), JavaScript Object Notation (JSON), or any other file type.

The conversion administrator 108 can determine if the article 128 received from the source 106 or the client device 104 conforms to a format. The format can describe characteristics of text, figures, or images of the article 128, such as location, size, content, characters, among others. The format can describe a file type or other transmission or storage type of the document. In some embodiments, the format can include a body (e.g., the body 146) or a title (e.g., the title 144). The conversion administrator 108 can identify the title 144 or the body 146 from the received article 128. In some embodiments, the conversion administrator 108 can use image recognition, text recognition, or other models to identify the title 144 and the body 146. For example, the conversion administrator 108 can determine that a string of text of the article 128 is a title based on, for example, a location, length, and font style of the string. In some embodiments, the conversion administrator 108 can identify the body 146. The conversion administrator 108 may identify the body by searching for keywords, such as keywords within a list 132 of words corresponding to a body. The conversion administrator 108 may identify the body 146 by searching for indents indicative of indentations, such as indentations of paragraphs. The conversion administrator 108 may identify the body 146 by identifying a string denoting a heading of the body 146. By identifying portions of the article 128, the conversion administrator 108 can determine if the article 128 satisfies the format.

The conversion administrator 108 may determine that the article 128 does not satisfy the format. The conversion administrator 108 may determine that the article 128 does not satisfy the format responsive to a determination that the article 128 does not include the title 144, the body 146, or both the title 144 and the body 146. In some embodiments, with the determination that the article 128 does not satisfy the format, the conversion administrator 108 can halt further processing of the article 128. In some embodiments, with the determination that the article 128 does not satisfy the format, the conversion administrator 108 can transmit an indication to the client device 104 for presentation on the user interface 142. The indication can include a message indicating that the article 128 is not a supported format.

The conversion administrator 108 can determine if the article satisfies a format including the title 144 and the body 146. In some embodiments, the conversion administrator 108 can determine that the article 128 received from the source 106 or the client device 104 satisfies the format by identifying the title 144 and the body 146 within the article 128. In some embodiments, the conversion administrator 108 can determine that the article 128 satisfies the format by identifying an identifier of the article 128 corresponding to the format. For example, the article 128 may include an identifier (e.g., an alphanumerical identifier or code) that matches the format including the body 146 and the title 144. With the determination that the article 128 satisfies the format, the conversion administrator 108 may pass the article to the article classifier 110, store the article 128 in the database 124, or perform other actions in conjunction with the systems and methods described herein, such as actions performed by the models 126.

The models 126 can be or include a multitude of machine learning models for generating the summary 130 from the article 128. In some embodiments, the models 126 can take varied data as input to produce, predict, or generate an output. The output can include various scores, identifiers, or summaries as described herein. The models 126 can include models such as Bag-of-Words, word embedding, or language models. For example, the models 126 can include natural language processing technologies such as Bidirectional Encoder Representations from Transformers (BERT), Word2Vec, or Term Frequency-Inverse Document Frequency (Tf-Idf), among others, to perform classification by a classifier.

A classifier can be a model of the models 126 which can identify subsets of a data set as belonging to a classification. In some embodiments, the classifier can take as input the article 128, or subsets of the article 128, such as one or more sections 148 or sentences 150. The classifier can provide classifications of the input as an output. The classifications can be pre-defined (e.g., a list of pre-determined classifications) or the classifier can generate the classifications based on the data set. In some embodiments, classifiers can classify a set of text, such as included within the article 128, into different categories. One or more classifiers may include neural networks, language models, or image or text recognition to classify text. In some embodiments, a classifier can include one or more models to identify frequent words (e.g., as in Bag-of-Words or BERT) and a machine learning algorithm trained on the frequency of the words (e.g., such as K-nearest neighbors, or other clustering algorithms).

The models 126 can include large language models (LLM). A large language model can include language models above a threshold size to generate text based on prompts. An LLM can include a neural network, and the size of an LLM can correspond to a number of nodes of a neural network, an amount of weights of the neural network, or an amount of biases of the neural network, among others. In some embodiments, a large language model can take text as input to generate tokens corresponding to words of the text. The tokens can be integers representing the frequency of a word or character within the text. Examples of large language models can include Generative Pre-training Transformer (GPT), FLAN-T5, text-bison@001, Pathways Language Model (PaLM), Large Language Model Meta AI (LLaMa), or Big-science Large Open-science Open-access Multilingual Language Model (BLOOM).

The article classifier 110 can classify the received article 128 with a section identifier and generate a confidence score for each sentence 150 of the article 128. The article classifier 110 can use a first classifier of the models 126 to classify the received article 128. The article classifier 110 may determine, for each sentence of the article 128, a section identifier. The section identifier can be a predetermined set of classifications, or the first classifier can determine the section identifiers based on, for example, text size, text style, font, location of text, frequency of text, among other attributes of the articles 128. The section identifiers may be classifications related to the sections 148 of the body. For example, the section identifiers may include classifications such as "TITLE," "OBJECTIVE," "BACKGROUND," "METHOD," "RESULTS," "CONCLUSIONS," or "INTRODUCTION," among others.

In some embodiments, by inputting each sentence of the sentences 150 of the article 128 into the first classifier, the article classifier 110 can generate the section identifier and the confidence score. The article classifier 110 can generate a confidence score for each sentence 150 of the article 128. The confidence score can indicate a likelihood of its respective sentence corresponding to its respective section 148. For example, the confidence score can indicate a likelihood that a first sentence 150A contains subject matter which would classify it as belonging to a section identifier such as "OBJECTIVE." The article classifier 110 can parse each sentence of the article 128 to assign the section identifier and determine the confidence score, based on the text within the sentence. The article classifier 110 can generate a dictionary of the article 128 in which each sentence is tagged with a section identifier and a confidence score associated with the sentence and sentence identifier. The dictionary can include linked data structures, such as a data structure including the sentence 150A and its respective sentence identifier and confidence score.

The article classifier 110 can determine that a first confidence score for a sentence is above a threshold 140 confidence score. The article classifier 110 can determine that the confidence score for a first sentence 150A is above, below, or at the threshold confidence score while generating the confidence scores or section identifiers for a remainder of the sentences 150. The article classifier 110 can determine that the confidence score for a first sentence 150A is above, below, or at the threshold confidence score subsequent to generating the confidence scores for all or a subset of the sentences 150. In some embodiments, the threshold 140 confidence score can be different for each sentence or section identifier.

In some embodiments, the article classifier 110 can determine that a confidence score for a first sentence 150A is above the threshold 140 confidence score. Upon the determination that the confidence score is above the threshold 140 confidence score, the article classifier 110 can associate the sentence with the section identifier corresponding to the confidence score. Associating the sentence with the section identifier can include generating a data structure for inclusion in the library linking the section identifier with the sentence.

In some embodiments, the article classifier 110 can determine that a confidence score for a second sentence 150A is at or below the threshold 140 confidence score. Upon the determination that the confidence score is at or below the threshold 140 confidence score, the article classifier 110 may associate the sentence with a different section identifier based on a next-highest confidence score. In some embodiments, upon the determination that the confidence score is at or below the threshold 140 confidence score, the article classifier 110 may assign no section identifier, or a null section identifier for the sentence. Upon the association of section identifiers for each sentence 150 of the article 128 or a subset of the article 128, the data processing system 102 may generate the prompts.

The prompt generator 112 can generate prompts for use by a large language model (LLM) based on the section identifiers. The prompts can be questions, sentences, or keywords intended to use as input for the LLM to generate the summaries 130. The prompts can include instructions to generate a section summary 130 for each section 148 based on the one or more sentences 150 included in the section 148. The prompt generator 112 can generate the prompts using the dictionary generated by the article classifier 110, such as by using the sentences 150 with their associated section identifiers or confidence scores.

The prompt generator 112 can generate a dictionary of prompts from the section identifiers and associated sentences. The dictionary can include data structures associating the prompt with other attributes, such as a "source" or "heading" for each section 148. The value of the source entry can be a list of strings, where each string corresponds to a paragraph in the article 128. In some embodiments, the heading attribute can be populated by a predetermined heading classification.

In some embodiments, the prompt generator 112 can generate the prompts based on user input. A user associated with the client device 104 can submit a list 132 of words or phrases for inclusion in the prompt, such as "What is the purpose" or "Effects of the experiment." The user may submit exemplary headings for the prompt, such as "Results" or "Title." The prompt generator 112 can generate the prompts by using the user submission and the output of the article classifier 110. For example, the prompt generator 112 may use as input a list of headings, the article 128, and the associations between the sentences 150 and the section identifiers to generate the prompts.

The summary generator 114 can generate the summaries 130 from the prompts using a large language model. The summary generator 114 can feed the prompts as input to one or more large language models of the models 126, as described herein. The summary generator 114 can generate the summaries 130 and populate the summaries 130 into the one or more dictionaries. The summary generator 114 can generate a summary for each section 148 of the article 128. The summary generator 114 can generate a summary for the article 128. The summary generator 130 can combine the section summaries to generate an article summary. The summary 130 can be a list of summarized paragraphs from the article 128, such as summarized sections of 148 of the article 128. In some embodiments, the summary generator 114 can generate the summaries 130 in multiple iterations of passes to the one or more LLM of the models 126. For example, a first summary can be generated by the LLM using the prompts, and a second summary can be generated by the LLM using the first summary, with or without the prompts. In this manner, iterative summaries 130 can be generated to further simplify the final summary 130, or to gather different summaries 130 for different prompts enacted for the same article 128.

The summary generator 114 may select an LLM of the models 126 to generate the summaries 130. In some embodiments, the summary generator 114 may select the LLM based on one or more metrics. The metrics can be established by user input, or automatically by the data processing system 102. The metrics can include a reading score, confidence score, or a classification score, among others. For example, the summary generator 114 may select the LLM which provides the lowest reading score, the highest confidence score for a section or sections 148, or the highest classification score indicating that a sentence belongs within a section of a summary. The metrics can include processing time. In some embodiments, the summary generator 114 may select the LLM to provide a minimized processing time, a processing time between two threshold processing times, a highest processing time below a maximum threshold processing time, among other processing times. The metrics can include a reading time. In some embodiments, the summary generator 114 may select the LLM to minimize the reading time indicating a period of time a user would take to read the summary 130. In some embodiments, the summary generator 114 may select the LLM to minimize a quantity of words from a deny list 132 appearing in the summaries 130. For example, a selected LLM or generative model can provide a higher metric than non-selected LLM or non-selected generative model.

In some embodiments, the LLM may introduce hallucinations to the summaries 130. The hallucinations can be subject matter, words, or conclusions about the article 128 which are not substantiated, included in, or evidenced by the article 128. LLM can introduced hallucinations due to the content of the training data supplied to the model, inherent human biases, statistical anomalies within the training data, among other reasons. The hallucination can result from the LLM fabricating, “imagining,” or otherwise creating information in the summary 130 that does not directly correspond to the article 128. Hallucinations can include the creation of fake or non-existent locations, references, persons, quotations, or other such provably false information or untrue claims. The introduction of these hallucinations can be undesirable, due to their insertion causing the summaries 130 to not accurately represent their corresponding article 128.

In some embodiments, the summary generator 114 can include an acronym module. The acronym module can extract, using one or more of the models 126, acronyms from the article 128. For example, the acronym module may include or use an LLM such as FLAN-T5 to extract the acronyms. The summary generator 114 can execute the acronym module to expand on definitions of acronyms contained within the text of the article 128. For example, the acronym module can use an LLM to generate definitions, expansions, or full word renderings of acronyms within the source 106, such as expanding “U.S.A.” to “United States of America” or “NIST” to “National Institute of Standards and Technology.” The acronym module can operate prior to, during, or subsequent to the generation of the summaries 130 by the summary generator 114. The acronym module can identify a definition from the acronyms by parsing the text of the source 106. For example, the acronym module can identify that the source 106 defines “AM” as “antemeridian” and not “amplitude modulation.” based on the text within the article 128 defining the acronym. The acronym module can generate definitions for acronyms. The acronym module may generate definitions for acronyms if a definition for an acronym is not identified within the text. For example, the article 128 may not define the acronym “NY” but the acronym module may generate a definition based on the models 126, such as “New York.”

In some embodiments, the summary generator 114 can extract a listing of key concepts, ideas, or sentences, among others, from the article 128 to be formatted as bullet points. The summary generator 114 may extract the information formatted as bullet points using one or more of the models 126. For example, the summary generator 114 may use the text of the article 128 as input to a LLM such as text-bison@001 to generate the bullet points.

In some embodiments, the summary generator 114 may generate bullet points as a part of generating the summaries 130. The summaries 130 can be or can include bullet points corresponding to key sentences, ideas, or concepts within the article 128. For example, the summary generator 114 may generate the summaries 130 as a list of bullet points, a paragraph summary, or another format of text. In some embodiments, the summary generator 114 can generate the summaries using the extracted bullet points. For example, the summary generator 114 may use the extracted bullet points as inputs to a LLM to generate the summaries 130. In some embodiments, the summary generator 114 may use the prompts, the bullet points, or a combination thereof to generate the summaries 130. In some embodiments, the summaries 130 may include the bullet points.

In some embodiments, the summary generator may, using the acronym module, simplify the text of the article 128 based on the identified and defined acronyms to generate the summaries 130. The acronym module may identify the acronyms within the text and replace the acronyms with the definitions generated or identified for the acronyms. For example, the acronym module may identify a passage including the phrase “Cytokin release syndrome (CRS)” and may remove the acronym “CRS” to read “Cytokin release syndrome” within the text. The acronym module may remove acronyms within the generated bullet points or the summaries 130.

The section filter 116 can provide filtering to remove hallucinations from the generated summaries 130. In some embodiments, the LLM may introduce subject matter relevant to other sections into a section. For example, the LLM may generate conclusions or results and may place those conclusions into sections of the summary 130. For example, the LLM may introduce conclusions within a “Background” or “Methods” section of summary 130. The section filter 116 can use the first classifier to identify sentences within the summaries 130 which do not correspond to the section summary in which the LLM placed them. Upon identification of the sentences which do not correspond, the section filter 116 can remove the sentences from the section summary 130. In some embodiments, the section filter 116 can remove the sentences which do not correspond to their section by deleting the sentences or moving the sentences to an appropriate, corresponding section as determined by the first classifier.

In some embodiments, the section filter 116 can identify the sentences that do not correspond to the section summary 130 which the LLM placed them in by generating a classification score. For example, the first classifier can use each sentence of the summaries 130 as input to generate a classification score for each sentence of the summaries 130. The classification score can indicate how likely a sentence of the summaries 130 is to belong to the section in which the LLM placed it. A high classification score can correspond to a high likelihood that a sentence of a section summary corresponds to the section summary in which it appears. A low classification score can correspond to a low likelihood that a sentence of a section summary corresponds to the section summary in which it appears. In some embodiments, the section filter 116 can remove sentences with a classification score below a threshold 140 classification score to generate an updated section summary for each section which had one or more sentences removed.

The article validator 118 can validate the article summary 130 by removing model bias from the generated article summary. Model bias can be or include hallucinations which results from inherent biases of the selected data set or supervisors associated with the training of the models 126, such as the LLM. For example, in an article 128 with subject matter pertaining to breast cancer, the LLM may refer to women in the summaries 130, even though men can also suffer from breast cancer. In some embodiments, these hallucinations or model biases may be filtered for by the article validator 118 to remove or replace. The article validator 118 can detect that new information (e.g., information not found in the article 128) has been inserted into the summaries 130 by the LLM. In some embodiments, the article validator 118 may determine the insertion of new information into the summaries 130 by the LLM using one or more of the models 126. The one or more models 126 can be or include a natural language processing model, such as Named Entity Recognition (NER) to identify the new information in the summaries 130.

The article validator 118 may identify one or more entities in each section of both the article 128 and the corresponding summaries 130 using the models 126, such as NER. The entities can include concepts within the summaries 130 and the article 128 such as general statements about the article 128, themes of the summary 130, words, phrases, facts (such as locations, citations, result data, etc.) displayed in the summary, among others. In some embodiments, upon identification of the one or more entities by the article validator 118, the article validator 118 can link, connect, or otherwise associate the entities among each other. In some embodiments, the second classifier can store the entities in a structure and link the entities by parsing a thesaurus including words related to the article 128. In some embodiments, the second classifier can store the identified entities in a tree and may build out the tree based on a comparison of an identified concept to the thesaurus of related words. For example, the article 128 may be a CSR including subject matter related to cancer. The second classifier may store the identified entities of the article 128 relating to cancer and the summaries 130 derived from the article 128 in a tree and may identify related concepts to the entities by parsing the National Cancer Institute Thesaurus (NCIT) for related words, phrases, or concepts.

The article validator 118 can determine that one or more entities present in the summaries 130 does not link to an entity present in the article 128. An entity present in the summary 130 but not present in the article 128 can be referred to as a missing concept. The article validator 118 can generate a list of missing concepts based on the linking between the entities of the article 128 and the entities of the summary 130. In some implementations, if one or more entities of a summary 130 does not link to the article 128, the article validator 118 can flag the non-linking entity. The article validator 118 may remove the non-linking entity, or the article validator 118 can generate an indicator related to the non-linking entity. For example, the article validator 118 may generate the indicator related to the non-linking entity to include the concept found in the summary 130 but not found in the corresponding article 128.

In some implementations, the article validator 118 can detect and remove model bias. Model bias can result in large language models due to implicit biases within the data sets used to train the models, and those who analyze the results of the model for verification. In some implementations, model bias can result in the LLM not returning a summary 130 for a section 148 of the article 128. The article validator 118 can detect model bias resulting in not generating one or more section summaries 130 by identifying that one or more sections of the article 128 are not represented in the sections summaries 130. In some embodiments, the article validator 118 can determine that a section summary 130 has not been generated, and can check the prompts for words within the prompts which may elicit model bias. Upon identification of the words eliciting mode bias, the article validator 118 can remove or substitute those words to circumvent the model bias.

The article validator 118 may remove hallucinations from the summaries 130 by searching for evidence, using a second classifier, within the article 128 to support the summaries 130. The evidence can include entities common to both the summaries 130 and the article 128, or phrases, words, or sentences common to both the summaries 130 and the article 128, among others. In some embodiments, the article validator 118 can use the second classifier to determine a confidence score for each sentence based on the evidence. The confidence score for each sentence can indicate a likelihood that the sentence of the summary 130 is not supported by its corresponding article 128.

The performance evaluator 120 can determine a score indicative of a reading level. The performance evaluator 120 may use one or more of a variety of algorithms for generating a reading level for the summaries 130, such as Flesch-Kincaid, Gunning-Fog, Dale-Chall, among other algorithms. The reading level can correspond to an age or education level at which the summary 130 is easy to read, comprehensible, or otherwise understood by the reading party. The reading level can correspond to an age or education level at which the summary takes under a threshold period of time to read and comprehend. The performance evaluator 120 can generate the score indicative of the reading level for the summaries 130 from the reading level calculated using one or more of the reading level algorithms, such as the reading level algorithms listed herein. The performance evaluator 120 can generate the score to indicate that a summary 130, article 128, or other text is at a specified reading level. For example, a score of 10 may correspond to a reading level associated with a subject matter expert, or a score of 10 may correspond to a reading level associated with a kindergartener.

The performance evaluator 120 can determine a period of time that the summary 130 takes a person to read. In some embodiments, the period of time that the summary 130 takes a person to read can be indicative of the reading level of the summary. For example, a longer period of time may correlate with a reading level associated with a more complex text, and a shorter period of time may correlate with a reading level associated with a simpler text.

The document provider 122 can provide the summary 130 to the client device 104 for presentation. In some embodiments, providing the summary 130 to the client device 104 can include transforming the summary 130 from a first file format to a second file format. For example, the document provider 122 may transform a JSON summary 130 to a DOC summary 130 for presentation on the client device 104. In some embodiments, providing the summary 130 to the client device 104 can include providing indicators of the summary 130. For example, the document provider 122 may provide the summary 130 in addition to the score indicating the reading level, the classification scores, the confidence scores, among other metrics and scores determined by the data processing system 102. Providing indicators can include providing comparisons between indicators. For example, the document provider 122 may provide a score associated with the reading level of the summary 130 and a score associated with the reading level of the article 128. The document provider 122 may present the summary with its corresponding indicators via the application 152 executing on the client device 104.

In some embodiments, the document provider 122 can perform word swapping for the summaries 130 prior to providing the summaries 130 to the client device 104 for presentation via the user interface 142. The document provider 122 may identify, access, or use a deny list 132A stored in the database 124. The document provider 122 may parse the summaries 130 to identify words within the summaries 130 included on the deny list 132A. In some implementations, the document provider 122 may substitute the identified words with words from an allow list 132B which map to corresponding words on the deny list 132A based on an index. For example, the word "fake medicine" may be included on the deny list 132A and may map to the word "placebo" on the allow list 132B. The document provider 122 may swap the word "fake medicine" for the word "placebo" in the summaries 130.

The conversion administrator 108 can train the models 126. The conversion administrator 108 may train the model 126 prior to accessing the article 128. The conversion administrator 108 may train the models using one or more articles 128, such as CSRs, publications, conference notes, or any such text of the one or more articles 128. In some embodiments, the conversion administrator 108 may use a multitude of the articles 128 as input to train the one or more models 126. In some embodiments, the articles 128 may be divided into a training set and a test set. The training set may include articles 128 which are used as inputs to the models 126 to generate known outputs to the models 126. The test set may be articles separate from the training set which are used as input to determine the accuracy of the models 126. For example, by using the training set as input to the models 126 subsequent to being trained with the training set, the models 126 can produce outputs which can be validated against known outputs. The model 126 can be continuously trained until the outputs are below an error. For example, the error can be the ratio of outputs that match known outputs to outputs that do not match known outputs. The error can be a means-square error. The conversion administrator 108 may train the models 126 using the articles 128 until the error is below an error threshold 140.

In some embodiments, the conversion administrator 108 may train the first classifier. The conversion administrator 108 may train the first classifier using one or more bodies 146 of the articles 128. In some embodiments, the conversion administrator 108 may train the first classifier using the bodies 146 as known inputs. The conversion administrator 108 may train the first classifier to generate classifications from the bodies 146. For example, the conversion administrator 108 may train the first classifier using the sentences 150 of the bodies 146 to identify classifications for each sentence of an article. In some embodiments, the classifications can be the section identifiers. The conversion administrator 108 may train the first classifier to provide an indication of how likely a sentence is to correspond to the classification it was assigned. For example, the conversion administrator 108 may train the first classifier to determine a likelihood that a sentence of a summary has been classified for the corresponding section.

In some embodiments, the conversion administrator 108 may train the second classifier. The conversion administrator 108 may train the second classifier using one or more bodies 146 of the articles 128. In some embodiments, the conversion administrator 108 may train the second classifier using the bodies 146. The conversion administrator 108 may train the second classifier using one or more of the summaries 130. In some embodiments, the conversion administrator 108 may train the second classifier using the summaries 130 and the bodies 146 to identify sentences, words, or concepts present in the summaries 130 but not in the corresponding articles 128.

The conversion administrator 108 can accept inputs from the client device 104 to change parameters related to the training of the models 126. In some embodiments, the conversion administrator 108 can retrain one or more of the models 126. The conversion administrator 108 may retrain the models 126 responsive to the error of a model exceeding the threshold 140 error, user input to retrain the models, or at scheduled frequencies, among others. The client device 104 may provide a signal indicating parameters for the training of the models 126, such as a duration of the training, size of the data set for training, content of the data set for training, weights associated with the model 126, among others.

The conversion administrator 108 can accept inputs from the client device 104 to select which of the models 126 are used during the generation of the summary 130 from the article 128. In some embodiments, the application 152 on the client device 104 may provide the user interface 142 as a command-line interface, low-code, or no-code platform to enable selection of a model 126. For example, the client device 104 may receive a selection of a large language model for the systems and methods described herein through the user interface 142. The conversion administrator 108 may accept inputs at any time. For example, the conversion administrator 108 may accept modifications to the models 126 before receiving the article 128, or during the generation of the summaries 130, such as after the generation of the prompts but prior to the generation of the summaries 130.

Referring now to FIG. 2, depicted is an illustrative flow diagram of a method 200 for summarizing text using a large language model. The method 200 can be executed, performed, or otherwise carried out by the data processing system 102, the computer system 400 described herein in conjunction with FIG. 4, or any other computing devices described herein. In brief overview of the method 200, the data processing system (e.g., the data processing system 102, etc.) can access an article (e.g., the article 128) (STEP 202); determine a section identifier and confidence score (STEP 204); provide a prompt including instructions to generation a section summary (e.g., the summary 130) (STEP 206); determine that a sentence of a first section has a classification score indicating the sentence belongs to second section (STEP 208); remove the sentence from the first section (STEP 210); generate an article summary (e.g., the summary 130) from the section summary (STEP 212); determine a first concept in the article summary is missing from the article (STEP 214); determine a confidence score indicating a likelihood that the sentence is not supported by the article (STEP 216); and provide a document including the article summary, a first indicator, and a second indicator (STEP 218).

Figure 3A:
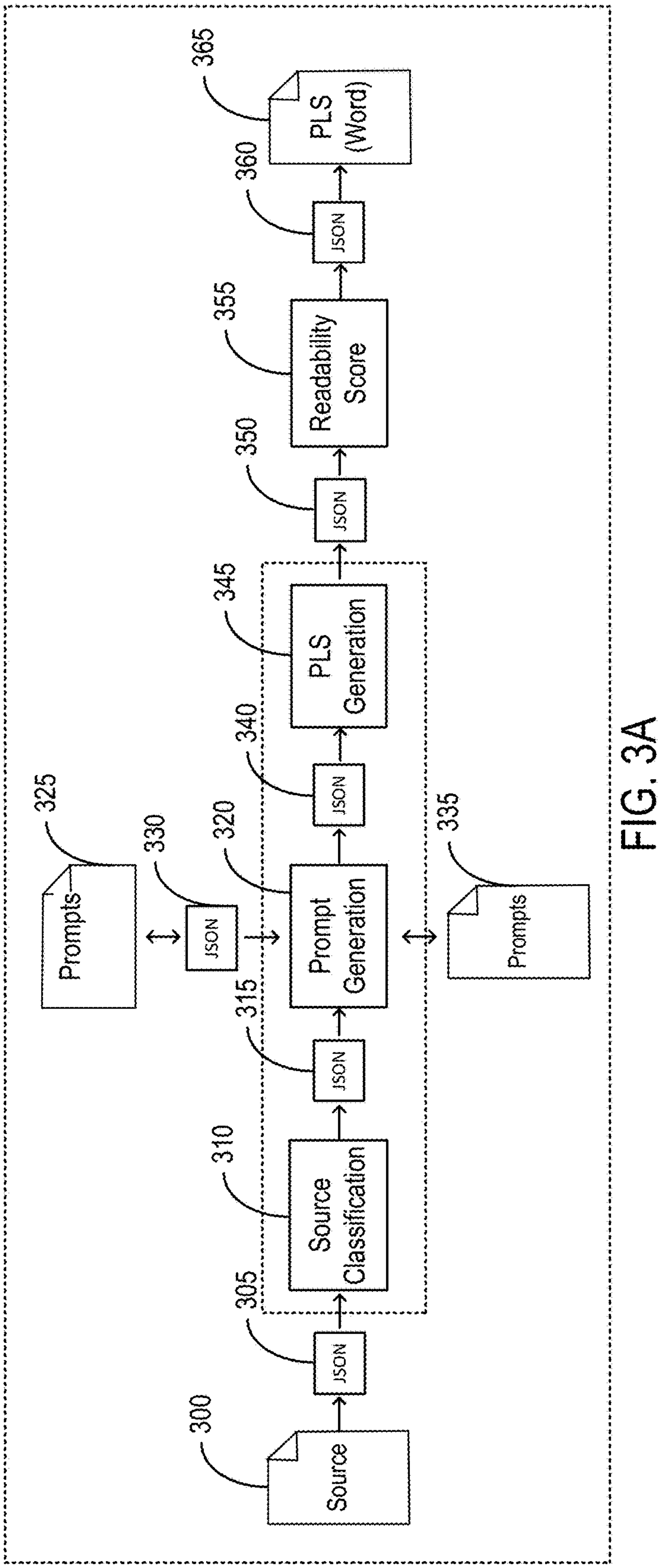
FIGS. 3A and 3B are example flow diagrams of a method for summarizing text using a large language model, in accordance with one or more implementations.
Figure 3B:
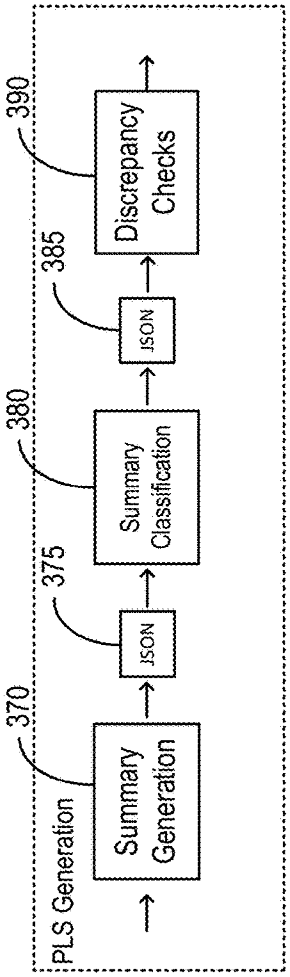

Referring now to FIGS. 3A and 3B, depicted are example flow diagrams of a method for summarizing text using a large language model. The method can be executed, performed, or otherwise carried out by the data processing system 102, the computer system 400 described herein in conjunction with FIG. 4, or any other computing devices described herein. Referring now to FIG. 3A, the method can include STEP 300, in which a source (e.g., the article 128) is provided. The source can be provided by an external computing system, such as the source 106. The source can be provided to a data processing system (e.g., the data processing system 102). The data processing system can retrieve the source.

At STEP 305, the source can be converted to a file type for processing by the data processing system, such as by the conversion administrator 108. For example, the data processing system may generate a data structure from the source as a JSON file type. At STEP 310, the source can be classified. The source can be classified by, for example, the article classifier 110. The source can be classified by sections of the source, sentences of the source, or any other subdivision of the source. In some embodiments, each sentence of the source can be assigned a section identifier. In some embodiments, the section identifier can correspond to or include a confidence score, such as the confidence score described with reference to the article classifier 110 herein.

At STEP 315, the section identifiers, the confidence scores, or the combination thereof can be added to the data structure associated with the source by the data processing system. At STEP 320, the data processing system can generate prompts. In some embodiments, the data processing system (e.g., the prompt generator 112) can generate the prompts based on the section identifiers. In some embodiments, the data processing system can generate the prompts using user input. At STEPS 325 and 335, a user can provide input for the generation of prompts to the data processing system via a client device (e.g., the client device 104). In some embodiments, the user input provided in STEP 325 may be added to the data structure associated with the article 128, or the user input may be added to a different data structure. At STEP 340, the generated prompts can be added to the data structure associated with the article 128 or to a different data structure generated by the data processing system for the prompts. In some embodiments, the data processing system may proceed to STEP 345, wherein the data processing system can generate a plain language summary (PLS). The method of STEP 345 and FIG. 3B are described herein with reference to FIGS. 3A and 3B. In some embodiments, the data processing system may proceed to the flow depicted in FIG. 4, before proceeding to subsequent steps associated with FIG. 3A. The depiction of the alternate flow is described in reference to FIG. 4 herein.

At STEP 345, the data processing system can generate a plain language summary (PLS) (e.g., the summary 130). The data processing system (e.g., the summary generator 114) can generate one or more summaries based on at least the prompts. Referring now to FIG. 3B, an expansion of the actions described in conjunction with STEP 345 is shown. At STEP 370, the summary is generated. The summary is generated by the data processing system using at least the prompts. At STEP 375, the data processing system stores the summaries in a data structure. At STEP 380, the data processing system (e.g., the section filter 116) classifies the summaries. The data processing system (e.g., the article validator 118) can classify the summaries by parsing each sentence for sentences including hallucinations. At STEP 385, any identified hallucinated sentences can be stored in a data structure. At STEP 390, the data processing system (e.g., the article validator 118) can check for discrepancies. Discrepancies can refer to the summary including information not present in the associated article.

Referring again to FIG. 3A, at STEP 350, the data processing system can create a data structure for the summaries, or the data processing system can include the summaries in the data structure associated with the article. At STEP 355, the data processing system (e.g., the performance evaluator 120) can generate a score corresponding to the readability of the summary, the article, or a combination thereof. The score corresponding to the readability can be like or include the score corresponding to the reading level described herein. At STEP 360, the score corresponding to the readability can be stored in a data structure. At STEP 365, the PLS can be presented to a user via a client device (e.g., the client device 104). Presenting the PLS can include presenting indicators generated for the PLS, such as the score corresponding to the reading level, a confidence score, a classification score, or any other metric determined by the data processing system and detailed herein.

Referring now to FIG. 4, depicted is an example flow diagram of a method for summarizing text using a large language model with a companion summarizer. The method can be executed, performed, or otherwise carried out by the data processing system 102, the computer system 500 described herein in conjunction with FIG. 5, or any other computing devices described herein. The method depicted in FIG. 4 can be in conjunction with, instead of, or in part with the acts of FIGS. 3A and 3B. In some embodiments, the acts of FIG. 4 can occur during the acts of FIGS. 3A and 3B, such as after ACT 340 or instead of ACT 345 and FIG. 3B.

At STEP 400, the data processing system can perform acronym extraction. The data processing system (e.g., the summary generator 114) can perform acronym extraction an acronym module, such as the acronym module described herein. The acronym module can use one or more machine learning models (e.g., the models 126) to identify and define acronyms within an article (e.g., the article 128). The acronyms can include abbreviations, combinations or standalone letters or numbers, or symbols intended to represent a full phrase or word. For example, "U.S.A." can be an acronym for "United States of America" or "MassDOT" can be an acronym for the full phrase "Massachusetts Department of Transportation." Upon extracting the acronyms and definitions from the article 128, the data processing system can store a listing of the acronyms and their corresponding definitions in a structure such as a JSON file (STEP 405).

At STEP 410, the data processing system can expand content. Expanding content can refer to the data processing system (e.g., the summary generator 114) removing acronyms from the text or replacing the acronyms with their definitions. For example, the data processing system can replace the acronym "MS" with "multiple sclerosis", or the data processing system can remove "MS" from the phrase "multiple sclerosis (MS)" appearing in the article 128 or the generated summaries 130. Upon expansion of the content, the data processing system may store the expanded content within a data structure such as a JSON file (STEP 415).

At STEP 420, the data processing system can extract content. The data processing system (e.g., the summary generator 114) can extract content such as a listing of phrases, key ideas, sentences, or items from the text of the article 128. For example, the data processing system can extract a listing of bullet points form the text of the article 128. The data processing system can use one or more models (e.g., the models 126) to extract the bullet points. The data processing system can extract the bullet points for each section (e.g., the sections 148), each summary (e.g., the summaries 130), sentence by sentence, or for the entirety of the article 128 or the summary 130. In some embodiments, the data processing system can identify a listing of objects, ideas, items, words, or sentences within the text in a listed comma order and transform the listing into a bullet list. For example, the data processing system may extract the content in the list "red, blue, yellow" into a bullet point list reading red
blue
yellow AT STEP 425, the data processing system can store the bullet points in a structure such as a JSON file.

At STEP 430, the data processing system can summarize the content. The data processing system (e.g., the summary generator 114) can generate the summaries 130 based on the bullet points. In some embodiments, the data processing system can generate the summaries using the prompts described herein, the bullet points, or a combination thereof. In some embodiments, the summaries can include the bullet points. The data processing system can summarize the content to generate the summaries using any of the functionalities described with reference to FIGS. 3A and 3B, such as in STEP 370.

At STEP 440, the data processing system can perform an evidence check. The evidence check can be like or relate to acts of FIGS. 3A and 3B, such as the discrepancy checks described with reference to STEP 390. In some embodiments, the evidence check can include the methods and systems described with reference to the performance of the article validator 118 of FIG. 1. For example, the data processing system can perform the evidence check by the data processing system (e.g., the article validator 118) parsing the summary for information not present in the associated article.

At STEP 450, the data processing system can perform a concepts check. The concepts check can be like or relate such as the discrepancy checks described with reference to STEP 390. In some embodiments, the evidence check can include the methods and systems described with reference to the performance of the article validator 118 of FIG. 1. For example, the data processing system can perform the evidence check by the data processing system (e.g., the article validator 118) parsing the summary for information not present in the associated article.

In some embodiments, while language including "large language models," "LLMs," or the like may be used, it should be understood that LLMs are an example of generative models, and one or more generative models can be used to perform the various functions or processes described herein. For example, one or more generative models can receive prompts corresponding to sections of an article and generate one or more article summaries based on the received prompts. In some embodiments, providing prompts based on sections can improve the quality or accuracy of generated article summaries by providing a structure for generating the summary or reducing hallucinations caused by inaccurate or generic prompts.

In some embodiments, the data processing system can adapt or refine a summary based on a target audience. For example, the data processing system can modify or tailor an article summary to correspond with a tone, a reading level, or other information (e.g., age, gender, pre-existing condition, region, etc.) of a target demographic. For example, the data processing system can determine that the average reading level of an audience of an article summary is a twelfth-grade reading level and that the article summary corresponds to a ninth-grade reading level using a classifier or generative model. In response, the data processing system can provide an updated or additional prompt to a generative model to cause the generative model to increase complexity or difficulty of a subsequent summary to align the summary with the target audience or demographic. For example, the data processing system can identify that a target audience includes medical professionals who frequently access summaries of clinical trial data. In an example, the data processing system can initially generate a summary at a general reading level intended for a broad audience. In response to recognizing that the target audience expects more technical detail, the data processing system may refine the summary by prompting the generative model to incorporate domain-specific terminology or provide more granular descriptions of methodology and outcomes in the article summary.

In some embodiments, the data processing system can generate or modify article summaries based on personas associated with the article summaries. Personas can include information or roles corresponding to an entity or individual providing the summary (e.g., source persona) and an entity or individual receiving the summary (e.g., target persona). For example, customized personas can refer to or include a scientist explaining a topic to a peer, a scientist explaining a topic to a doctor, a doctor explaining a topic to a patient, and so on. For example, the data processing system may identify a source persona as a researcher presenting detailed findings from a clinical study and a target persona as a general audience with limited familiarity with scientific terminology. In this context, the data processing system can analyze the source content and generate a summary tailored to the target persona by simplifying the vocabulary, removing jargon, or focusing on key takeaways. For example, a scientific description such as, "The randomized controlled trial demonstrated a 25% relative risk reduction in symptomatic cases over a 12-month follow-up period," could be modified for a general audience to, "The study showed that the treatment reduced the chances of getting sick by 25% over a year." In another example in which a target persona includes individuals who might exhibit skepticism towards the subject matter, the data processing system can adapt the summary to present information in a neutral tone and incorporate supporting evidence to build credibility.

In some embodiments, the data processing system can extract a document structure from a source document. For example, the document structure can include or refer to sections of the source document, and the sections of the source document can correspond with sections of a generated article summary. For example, the data processing system can identify headings and subheadings (e.g., "Introduction," "Methods," "Results") to map content between the source document and the article summary. In some embodiments, the data processing system can compare concepts in sections of a source document to concepts in corresponding sections of the article summary. For example, the data processing system can determine that a "Results" section in the source document includes a conclusion such as "The experiment demonstrated a 15% increase in efficiency" and verify that data corresponding to this conclusion is included and accurately represented in the corresponding section of the summary.

In some embodiments, the data processing system can link sections across documents or summarized based on the extracted document structure. For example, the data processing system can analyze headings, subheadings, and semantic content using classification models or natural language processing techniques to identify relationships between sections in a source document and corresponding sections in related documents. In some examples, the data processing system can use a generative model to refine the linked content by generating prompts that align semantic themes or key concepts across documents. For example, the generative model can generate a prompt to summarize interrelated sections containing similar terminology or shared references. Linking can include calculating similarity scores or semantic distances between sections to establish correspondences or resolve potential inconsistencies. Additionally, the linked sections can be used to generate a unified structure for a composite summary or to refine individual summaries based on corroborating or conflicting data from related documents.

In some embodiments, the data processing system can assign a tone or voice to each section of an article summary. For example, the data processing system can determine an appropriate tone for a section based on the content or context of the section. Determining a tone can include analyzing the semantic content of a section to classify the section using classification models, generative models, and so on. For example, the data processing system can assign an upbeat tone to a section discussing efficacy results (e.g., positively emphasizing achievements and improvements) while adopting a more sober and neutral tone for sections addressing adverse effects or limitations. The data processing system can use a generative model to refine the tone of a section by rephrasing content or adjusting language to match an assigned tone. The data processing system can assign tones to individual sections or assign a tone uniformly across multiple sections of the article summary.

In some embodiments, the data processing system can generate diagrams or illustrations to indicate or explain various concepts included the article summary. The diagrams or illustrations can include flowcharts, graphs, timelines, or other visual elements that correspond to sections or concepts of the article summary. For example, the data processing system can generate a flowchart illustrating the progression of an experiment, a graph displaying statistical results, or a timeline showing data points discussed in the article summary. The data processing system can render or present diagrams or illustrations as graphical elements via a graphical user interface (GUI) on a client device. Additionally, the data processing system can use a generative model to generate illustrative content based on prompts derived from the text of the article summary (e.g., creating a diagram to represent a process described in a "Methods" section or a bar chart summarizing data from a "Results" section). The data processing system can dynamically update or adjust the generated diagrams or illustrations to reflect changes in the underlying article summary or user preferences (e.g., tone preferences, output formats, etc.).

In some embodiments, the data processing system can generate various dictionaries or guides to explain concepts included in the article summary. For example, the data processing system can generate one or more acronym dictionaries. The acronym dictionaries can include a mapping of acronyms to corresponding full terms (e.g., "CRS" mapped to "Cytokine Release Syndrome"). For example, an acronym dictionary can provide expanded definitions or clarifications within the article summary or accompanying materials. The data processing system can update the acronym dictionaries based on the content of the article summary or preferences (e.g., a rule for generating expanded definitions only for acronyms not previously explained). In some embodiments, the data processing system can generate pronunciation guides or "how-to-pronounce" guides. The pronunciation guides can include phonetic spellings or audio pronunciations of complex terms. For example, the data processing system can generate a pronunciation guide using text-to-speech models or linguistic analysis tools. For example, the data processing system can provide a guide to pronounce a term like "angiogenesis" alongside its definition and context in the article summary. In an example, the data processing system can present dictionaries or guides integrated with the article summary, as standalone references, or integrated into a graphical user interface.

In some embodiments, the data processing system can perform summary validation using various techniques. For example, the data processing system can identify facts or assertions of facts included in the article summary. An assertion of fact can include or refer to a statement or conclusion supported by information in the source document, such as data points, statistical findings, or cited references. For example, the data processing system can identify numeric references (e.g., citations, a "15% improvement," a "p-value of 0.01," etc.) included in the article summary and associate the numeric references with corresponding content in the source document. In response, the data processing system can validate the numeric references by comparing the references with the source document to verify or validate alignment between the summarized information and the original data. Validating can include generating various confidence scores (e.g., scores for each assertion) indicating a likelihood of accuracy of factual assertions included in the article summary based on corresponding content in the source document. In an example, validating can include determining if one or more sections or portions of a document satisfy or do not satisfy validation criteria (e.g., accuracy values, confidence score, error thresholds, etc.).

In some embodiments, the data processing system can analyze an article summary to detect hallucinations corresponding with a generative model or LLM. For example, hallucinations can include or refer to inappropriate tone, use of jargon, excessive use of qualifying phrases (e.g., anonymous authority or weasel words), hedging, extravagance (e.g., excessive use of words such as "very," "only," "most," etc.), and ambiguity (e.g., use of metaphor). The data processing system can detect hallucinations by analyzing linguistic patterns and semantic content in the article summary using generative models, natural language processing (NLP) models, or classifiers. For example, the data processing system can parse the text of the article summary to identify instances of language patterns corresponding to predefined categories or types of hallucinations. For example, the data processing system can use a classification model to tag segments of the article summary with labels indicating potential hallucinations.

In some embodiments, the data processing system can generate assessments of article summaries. For example, the data processing system can perform or execute a Program for the International Assessment of Adult Competencies (PIAAC) analysis or a survey of adult skills (e.g., techniques to map reading levels to corresponding distributions within a population) using the article summary to determine a potential audience for the article summary. For example, the data processing system can identify or calculate various reading metrics corresponding with the article summary or population. The reading metrics can include assessments or results of assessments such as Flesch Kincaid, Flesch Reading Ease Score, Gunning FOG, Coleman Liau, Dale Chall, ARI (Automated Readability Index), Linsear Write, Space readability, SMOG index, text standard (based on one or more combination of the above tests), PIAAC distribution, or reading time assessments. For example, the data processing system can calculate a reading time corresponding with article summary based on a reading level of the target audience for the article summary. In another example, the data processing system can calculate a Flesch Reading Ease Score for the article summary based on an average sentence length and average number of syllables per word in the text. The data processing system can re-process, update, or refine the article summary based on results of the assessments.

In some embodiments, the data processing system can re-process the summary for additional or further validation. For example, the data processing system can determine issues or errors associated with the article summary identified during a previous validation process or assessment process. In response, the data processing system can regenerate the article summary using a generative model or LLM to address the identified issues or errors by providing an updated output (e.g., new or refined summary). For example, the data processing system can calculate an aggregate grade-level score using a combination of metrics, such as Flesch Kincaid and SMOG index, and determine that the score does not meet a predefined target for the intended audience. In response, the data processing system can rerun a generative process with an augmented prompt configured to simplify sentence structure, reduce average syllables per word, or provide additional context to improve comprehension. Additionally, the data processing system can implement iterative adjustments by re-evaluating and refining the generated summaries until various thresholds or parameters are satisfied (e.g., target reading level, accuracy metrics, etc.).

In some embodiments, the data processing system can produce a summary output in response to re-processing the summary. The summary output can include comments or tags generated by a generative model or LLM to indicate errors or issues identified during a validation process. For example, the comments or tags can highlight areas where the summary diverges from the source document, such as inaccuracies in numerical references, unsupported conclusions, or deviations in tone or structure. The comments or tags can be modeled to simulate feedback received during a manual review process by providing actionable suggestions to refine the summary. For example, the comments can suggest simplifying specific sentences, removing ambiguous language, or rephrasing complex statements to align with target readability metrics. The comments or tags can be modeled to simulate comments received during a manual review process. In some embodiments, the data processing system can include or incorporate optimizations during the re-processing of the summary. For example, the data processing system can optimize the summarizing by skipping one or more stages of processing, such as segmentation, validation, or assessment. For example, the data processing system can bypass processing or validation steps in response to determining the generated summary meets predetermined thresholds or parameters (e.g., reading level, accuracy, tone alignment).

In some embodiments, the various processes and techniques above can be implemented in various applications. The applications can include scientific abstract plain language summarization applications (e.g., summarization of an abstract section of a scientific or research paper) or scientific abstract PLS applications, manuscript PLS applications, video PLS applications, clinical study report PLS applications, custom PLS applications, and so on. In some embodiments, the PLS applications can provide data (e.g., summaries) in multiple output formats or a single format (e.g., based on a type of the PLS application). Each of the PLS application can receive input data (e.g., document, article) and generate a corresponding output (e.g., article summary). In some embodiments, the PLS applications can provide data (e.g., summaries) in multiple output formats (e.g., documents such as PDF, JSON, or DOCX, video formats, etc.) or a single format based on the type of PLS application and user requirements. For example, a PLS application can receive input data, such as a document, article, or video transcript, and generate a corresponding output, such as an article summary, video summary, or structured report. The PLS applications can use generative models or large language models to generate summaries.

For example, the data processing system can execute or interface with a scientific abstract PLS application. The scientific abstract PLS application can generate or output a plain language summary of a scientific abstract. For example, the scientific abstract PLS application can analyze a research abstract provided as an input and generate a summary for a doctor to use to explain concepts included in the research abstract to a patient. In some embodiments, the scientific abstract PLS application can provide additional outputs, such as annotated diagrams or visual aids generated based on the extracted data from the research abstract.

The data processing system can execute or interface with one or more manuscript PLS applications. The manuscript PLS applications can provide outputs (e.g., summaries) in various formats. For example, the manuscript PLS application can generate an output in an in-house format. For example, the manuscript PLS application can generate a plain language summary of a scientific paper to provide to a non-scientific audience. The in-house format manuscript PLS application can map a structure (e.g., sections) of an input document to a structure (e.g., sections) of the outputted summary. For example, the in-house format manuscript PLS application can interpret or translate content from a scientific paper into plain language for a non-scientific audience using one or more generative models. In some embodiments, the manuscript PLS application can generate outputs in journal-specific formats. For example, the manuscript PLS application can translate technical content into a structured summary adhering to predefined formatting guidelines (e.g., section order, content length, terminology preferences) of a journal or publication group. Additionally, the manuscript PLS application can produce manuscript summaries tailored for scientific audiences, such as concise summaries (e.g., one or two pages) that emphasize key findings, methodologies, and implications. For example, the manuscript PLS application can summarize a scientific manuscript into a concise (e.g., one page, two page, etc.) summary for a scientific audience. In some embodiments, the manuscript PLS application can summarize multiple manuscripts. For example, the manuscript PLS application can summarize a collection of manuscripts (e.g., two or more) into a summary for a scientific audience. In some embodiments, the manuscript PLS application can generate a multiple manuscript document comparison summary. For example, the manuscript PLS application can summarize various similarities or differences between multiple source documents using a generative model or LLM.

The data processing system can execute or interface with a video PLS application. The video PLS application can generate a plain language summary in video format (e.g., MP4, WebM, or other formats). The video plain language summary can include visual elements, such as animations, charts, narrated explanations, or on-screen text, to communicate complex information to a target audience. For example, the video PLS application can analyze input data, such as a clinical trial report, and generate a video summary refined for an audience of patients, caregivers, or other non-specialist individuals by simplifying technical terminology and emphasizing key takeaways (e.g., trial objectives, results, and implications). Additionally, the video PLS application can use generative models or LLMs to script a narrative or textual content of the video based on input data. For example, the application can generate a narrated explanation of a "Methods" section by summarizing procedural information and accompanying the explanation with corresponding animations or visuals. In some embodiments, the video PLS application can dynamically update content of the video summary in response to changes in the input data (e.g., revisions to clinical trial results, the addition of new datasets, etc.).

The data processing system can execute or interface with a clinical study report PLS application. The clinical study report PLS application can generate a plain language summary of a clinical trial or study in formats compliant with specific regulatory or distribution requirements, such as the European Union (EU) format or other standardized formats. For example, the clinical study report PLS application can analyze input data, such as trial results, methodologies, or participant demographics, and generate a plain language summary including structure or content aligning with EU clinical trial regulation guidelines. For example, the clinical study report PLS application can structure the summary to include sections such as trial objectives, study design, key findings, and safety data while verifying the content meets readability and accessibility standards for non-specialist audiences.

The data processing system can execute or interface with various custom PLS applications. The custom PLS applications can map input document structures to custom output formats based on specific use cases or audience needs. In an example, a custom PLS application can generate a NICE Summary of Information for Patients (SIP). For example, the custom PLS application can analyze NICE submission reports using a generative model and produce a summary structured to simplify complex regulatory data for a non-specialist audience while maintaining key compliance elements. In an example, a custom PLS application can generate a scientific summarization for a technical or non-layperson audience, such as a summary of research findings designed for peer review or professional analysis. For example, the custom PLS application can condense experimental protocols and statistical analyses into concise, domain-specific language for inclusion in a technical briefing document. In an example, a custom PLS application can generate a medical inquiry response summary. For example, the custom PLS application can extract relevant sections from drug information sheets and compile a response tailored to address predefined queries, such as dosing guidelines, contraindications, or side effects. Additionally, custom PLS applications can adapt output formats dynamically to meet different regulatory, institutional, or user-driven requirements.

As used herein, the language "in response to" can include or refer to an action or process that is performed or executed subsequent to, responsive to, directly in response to, upon, following, or based on various actions, events, conditions, or inputs.

Figure 5:
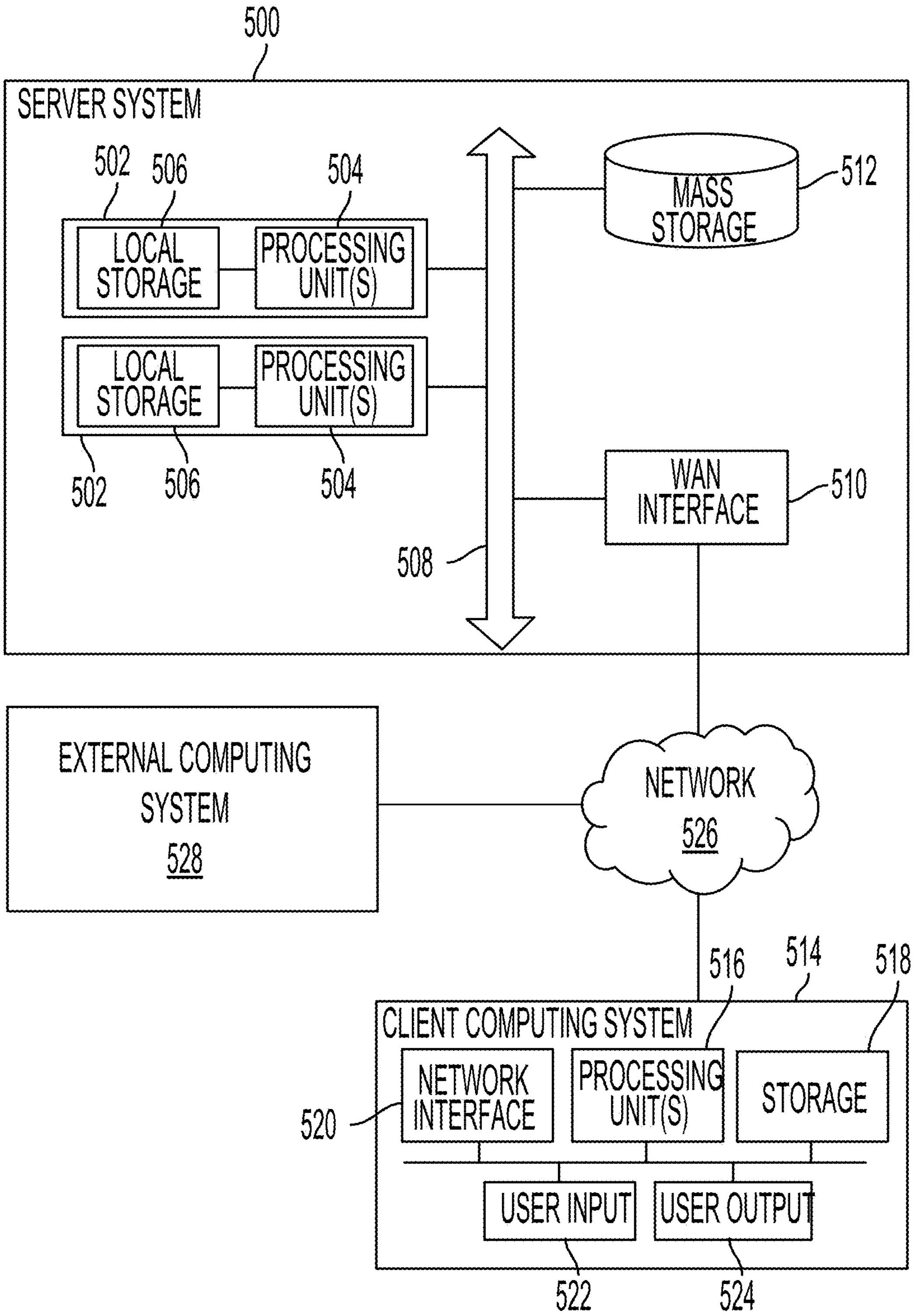
FIG. 5 is a block diagram depicting embodiments of computing devices useful in connection with the methods and systems described herein.

Referring now to FIG. 5, depicted is a block diagram 500 depicting embodiments of computing devices useful in connection with the methods and systems described herein.

Various operations described herein can be implemented on computer systems. FIG. 5 shows a simplified block diagram of a representative server system 500, client computer system 514, and network 526 usable to implement certain embodiments of the present disclosure. In various embodiments, server system 500 or similar systems can implement services or servers described herein or portions thereof. Client computer system 514 or similar systems can implement clients described herein. The system 500 described herein can be similar to the server system 500. Server system 500 can have a modular design that incorporates a number of modules 502 (e.g., blades in a blade server embodiment); while two modules 502 are shown, any number can be provided. Each module 502 can include processing unit(s) 504 and local storage 506.

Processing unit(s) 504 can include a single processor, which can have one or more cores, or multiple processors. In some embodiments, processing unit(s) 504 can include a general-purpose primary processor as well as one or more special-purpose co-processors such as graphics processors, digital signal processors, or the like. In some embodiments, some or all processing units 504 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 404 can execute instructions stored in local storage 506. Any type of processors in any combination can be included in processing unit(s) 504.

Local storage 506 can include volatile storage media (e.g., DRAM, SRAM, SDRAM, or the like) and/or non-volatile storage media (e.g., magnetic or optical disk, flash memory, or the like). Storage media incorporated in local storage 506 can be fixed, removable, or upgradeable as desired. Local storage 506 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 504 need at runtime. The ROM can store static data and instructions that are needed by processing unit(s) 404. The permanent storage device can be a non-volatile read-and-write memory device that can store instructions and data even when module 502 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 506 can store one or more software programs to be executed by processing unit(s) 504, such as an operating system and/or programs implementing various server functions such as functions of the system 500 or any other system described herein, or any other server(s) associated with system 500 or any other system described herein.

"Software" refers generally to sequences of instructions that, when executed by processing unit(s) 504, cause server system 500 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 504. Software can be implemented as a single program or a collection of separate programs or program modules that interact as desired. From local storage 506 (or non-local storage described below), processing unit(s) 504 can retrieve program instructions to execute and data to process in order to execute various operations described above.

In some server systems 500, multiple modules 502 can be interconnected via a bus or other interconnect 508, forming a local area network that supports communication between modules 502 and other components of server system 500. Interconnect 508 can be implemented using various technologies, including server racks, hubs, routers, etc.

A wide area network (WAN) interface 510 can provide data communication capability between the local area network (e.g., through the interconnect 508) and the network 526, such as the Internet. Other technologies can be used to communicatively couple the server system with the network 526, including wired (e.g., Ethernet, IEEE 802.3 standards) and/or wireless technologies (e.g., Wi-Fi, IEEE 802.11 standards).

In some embodiments, local storage 506 is intended to provide working memory for processing unit(s) 504, providing fast access to programs and/or data to be processed while reducing traffic on interconnect 508. Storage for larger quantities of data can be provided on the local area network by one or more mass storage subsystems 512 that can be connected to interconnect 508. Mass storage subsystem 512 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 512. In some embodiments, additional data storage resources may be accessible via WAN interface 510.

Server system 500 can operate in response to requests received via WAN interface 510. For example, one of modules 502 can implement a supervisory function and assign discrete tasks to other modules 502 in response to received requests. Work allocation techniques can be used. As requests are processed, results can be returned to the requester via WAN interface 510. Such operation can generally be automated. Further, in some embodiments, WAN interface 510 can connect multiple server systems 500 to each other, providing scalable systems capable of managing high volumes of activity. Other techniques for managing server systems and server farms (collections of server systems that cooperate) can be used, including dynamic resource allocation and reallocation.

Server system 500 can interact with various user-owned or user-operated devices via a wide-area network such as the Internet. An example of a user-operated device is shown in FIG. 5 as client computing system 514. Client computing system 514 can be implemented, for example, as a consumer device such as a smartphone, other mobile phone, tablet computer, wearable computing device (e.g., smart watch, eyeglasses), desktop computer, laptop computer, and so on.

For example, client computing system 514 can communicate via WAN interface 510. Client computing system 514 can include computer components such as processing unit(s) 516, storage device 518, network interface 520, user input device 522, and user output device 524. Client computing system 514 can be a computing device implemented in a variety of form factors, such as a desktop computer, laptop computer, tablet computer, smartphone, other mobile computing device, wearable computing device, or the like.

Processing unit 516 and storage device 518 can be similar to processing unit(s) 504 and local storage 506 described above. Suitable devices can be selected based on the demands to be placed on client computing system 514. For example, client computing system 514 can be implemented as a "thin" client with limited processing capability or as a high-powered computing device. Client computing system 514 can be provisioned with program code executable by processing unit(s) 516 to enable various interactions with server system 500.

Network interface 520 can provide a connection to the network 526, such as a wide area network (e.g., the Internet) to which WAN interface 510 of server system 500 is also connected. In various embodiments, network interface 520 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 522 can include any device (or devices) via which a user can provide signals to client computing system 514; client computing system 514 can interpret the signals as indicative of particular user requests or information. In various embodiments, user input device 522 can include any or all of a keyboard, touch pad, touch screen, mouse or other pointing device, scroll wheel, click wheel, dial, button, switch, keypad, microphone, and so on.

User output device 524 can include any device via which client computing system 514 can provide information to a user. For example, user output device 524 can include display-to-display images generated by or delivered to client computing system 514. The display can incorporate various image generation technologies, e.g., a liquid crystal display (LCD), light-emitting diode (LED) display including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 524 can be provided in addition to or instead of a display. Examples include indicator lights, speakers, tactile "display" devices, printers, and so on.

Some embodiments include electronic components, such as microprocessors, storage, and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 504 and 516 can provide various functionality for server system 500 and client computing system 514, including any of the functionality described herein as being performed by a server or client, or other functionality.

It will be appreciated that server system 500 and client computing system 514 are illustrative and that variations and modifications are possible. Computer systems used in connection with embodiments of the present disclosure can have other capabilities not specifically described here. Further, while server system 500 and client computing system 514 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus," "data processing system," "client device," "computing platform," "computing device," or "device" encompass all kinds of apparatuses, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system such as the data processing system 102 can include clients and servers. For example, the data processing system 102 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 102 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for modeling live events, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:

one or more processors coupled to memory, the one or more processors configured to:

access an article including a title and a body;

identify, from the article, a plurality of sections;

provide, to one or more generative pre-training transformer (GPT) models, for each section of the plurality of sections of the article, a prompt including instructions to generate a section summary for the section based on one or more sentences included in the section, wherein providing the prompt to the one or more GPT models comprises the one or more processors to select the one or more GPT models from a plurality of GPT models based on the selected one or more GPT models providing higher metrics than non-selected GPT models, the metrics comprising at least two of:

a minimization of a classification score indicating a likelihood that the one or more sentences included in the section correspond to the section summary;

a minimization of processing time;

a minimization of a score indicating a duration a user associated with a client device is reading;

a minimization of a period of time associated with a reading time, and a minimization of words on a deny list included within the section summaries;

generate an article summary based on the section summary generated for each section;

determine, using the one or more GPT models, from the article summary, a first concept found in the article summary that is missing from the article;

determine, using a classifier, for a first sentence included in the article summary, a confidence score indicating a likelihood that the first sentence is not supported by the article;

and provide, for presentation at the client device, a document including the article summary, a first indicator corresponding to the first concept and a second indicator corresponding to the first sentence.

2. The system of claim 1, wherein the classifier is a first classifier, and comprising the one or more processors to:

determine, using the first classifier responsive to providing the prompt to generate the section summary for the section, that at least one sentence included in a section summary of a first section of the plurality of sections of the article has a classification score indicating that the at least one sentence belongs to a second section of the plurality of sections of the article;

remove the at least one sentence from the section summary of the first section to generate an updated section summary of the first section; and generate the article summary based on the section summary generated for each section and the updated section summary of the first section.

3. The system of claim 1, comprising the one or more processors to:

determine, responsive to determining the confidence score indicating the likelihood that the first sentence is not supported by evidence in the article, a score indicating a reading level for the article summary; and provide, for presentation at the client device, the document including the score.

4. The system of claim 1, comprising the one or more processors to:

determine, responsive to determining the confidence score indicating the likelihood that the first sentence is not supported by evidence in the article, a period of time indicating a duration a user associated with the client device is reading for each of the article summary and the article; and provide, for presentation at the client device, the document including the period of time.

5. The system of claim 1, wherein providing the document comprises the one or more processors to:

identify a deny list of words associated with the article;

parse the article summary to identify a first word of the deny list appearing within the article summary; and replace the first word appearing within the article summary with a second word based on an index mapping the deny list of words to an allow list of words.

6. The system of claim 1, comprising the one or more processors to:

determine, responsive to determining a section identifier and a confidence score for each sentence, that a first confidence score for a sentence is above a threshold confidence score;

associate the sentence with the section identifier corresponding to the first confidence score;

determine that a second confidence score for a second sentence is at or below the threshold confidence score; and associate the second sentence with a second section identifier different than the section identifier associated with the first confidence score.

7. The system of claim 1, wherein the classifier comprises a first classifier and a second classifier, and comprising the one or more processors to:

train the first classifier using a plurality of bodies from a plurality of articles to recognize a plurality of section identifiers; and train the second classifier using a plurality of sentences of a plurality of section summaries and the plurality of bodies to compare the plurality of sentences to the plurality of bodies.

8. The system of claim 1, comprising the one or more processors to:

determine that the article satisfies a format comprising the body and the title; and access the article responsive to the determination that the article satisfies the format.

9. The system of claim 1, comprising the one or more processors to:

determine that a second article does not satisfy a format comprising the body and the title; and provide, for presentation at the client device, an indication of the second article not satisfying the format.

10. The system of claim 1, comprising the one or more processors to provide, for presentation at the client device, the document comprising a comparison of a first score indicating a reading level associated with the article summary and a second score indicating a reading level associated with the article.

11. The system of claim 1, wherein to identify, from the article, a plurality of sections, the one or more processors configured to provide, to a GPT model, a prompt to cause the GPT model to output portions of the body of the article in respective sections of the plurality of sections.

12. The system of claim 1, wherein the classifier is a first classifier, wherein the body includes a plurality of sentences, and wherein to identify, from the article, a plurality of sections, the one or more processors configured to determine, by inputting each sentence of the one or more sentences of the article into the first classifier, a section identifier and a confidence score for each sentence, the confidence score indicating a likelihood of its respective sentence corresponding to its respective section identifier.

13. The system of claim 1, wherein to generate the article summary, the one or more processors configured to iteratively prompt the one or more GPT models based on a threshold associated with the article summary.

14. A method, comprising:

accessing, by one or more processors coupled to memory, an article including a title and a body;

identifying, by the one or more processors, from the article, a plurality of sections;

providing, by the one or more processors, to one or more GPT models, for each section of the plurality of sections of the article, a prompt including instructions to generate a section summary for the section based on one or more sentences included in the section, wherein providing the prompt to the one or more GPT models comprises selecting the one or more GPT models from a plurality of GPT models based on the selected one or more GPT models providing higher metrics than non-selected GPT models, the metrics comprising at least two of:

a minimization of a classification score indicating a likelihood that the one or more sentences included in the section correspond to the section summary;

a minimization of processing time;

a minimization of a score indicating a duration a user associated with a client device is reading;

a minimization of a period of time associated with a reading time; and a minimization of words on a deny list included within the section summaries;

generating, by the one or more processors, an article summary based on the section summary generated for each section;

determining, by the one or more processors using the one or more GPT models, from the article summary, a first concept found in the article summary that is missing from the article;

determining, by the one or more processors, using a classifier, for a first sentence included in the article summary, a confidence score indicating a likelihood that the first sentence is not supported by the article; and providing, by the one or more processors, for presentation at the client device, a document including the article summary, a first indicator corresponding to the first concept and a second indicator corresponding to the first sentence.

15. The method of claim 14, wherein the classifier is a first classifier, and the method comprising:

determining, by the one or more processors responsive to providing the prompt to generate the section summary, using the first classifier, that at least one sentence included in a section summary of a first section of the plurality of sections of the article has a classification score indicating that the at least one sentence belongs to a second section of the plurality of sections of the article;

removing, by the one or more processors, the at least one sentence from the section summary of the first section to generate an updated section summary of the first section; and generating, by the one or more processors, the article summary based on the section summary generated for each section and the updated section summary of the first section.

16. The method of claim 14, comprising:

determining, by the one or more processors, responsive to determining the confidence score indicating the likelihood that the first sentence is not supported by evidence in the article, a score indicating a reading level for the article summary; and providing, by the one or more processors, for presentation at the client device, the document including the score.

17. The method of claim 14, comprising:

determining, by the one or more processors, responsive to determining the confidence score indicating the likelihood that the first sentence is not supported by evidence in the article, a period of time indicating a duration a user associated with the client device is reading for each of the article summary and the article; and providing, by the one or more processors, for presentation at the client device, the document including the period of time.

18. The method of claim 14, comprising:

determining, by the one or more processors, responsive to determining a section identifier and a confidence score for each sentence, that a first confidence score for a sentence is above a threshold confidence score;

associating, by the one or more processors, the sentence with the section identifier corresponding to the first confidence score;

determining, by the one or more processors, that a second confidence score for a second sentence is at or below the threshold confidence score; and associating, by the one or more processors, the second sentence with a second section identifier different than the section identifier associated with the first confidence score.

19. The method of claim 14, comprising:

determining, by the one or more processors, that the article satisfies a format comprising the body and the title; and accessing, by the one or more processors, the article responsive to the determination that the article satisfies the format.

20. The method of claim 14, comprising:

determining, by the one or more processors, that a second article does not satisfy a format comprising the body and the title; and providing, by the one or more processors, for presentation at the client device, an indication of the second article not satisfying the format.

21. The method of claim 14, wherein identifying, from the article, the plurality of sections comprises providing, to a GPT model, a prompt to cause the GPT model to output portions of the body of the article in respective sections of the plurality of sections.

22. The method of claim 14, wherein the classifier is a first classifier, and wherein identifying, from the article, the plurality of sections comprises determining, by inputting each sentence of the one or more sentences of the article into the first classifier, a section identifier and a confidence score for each sentence, the confidence score indicating a likelihood of its respective sentence corresponding to its respective section identifier.

23. The method of claim 14, wherein generating the article summary comprises iteratively prompting the one or more GPT models based on a threshold associated with the article summary.

24. A system, comprising:

one or more processors coupled to memory, the one or more processors configured to:

access an article including a title and a body;

identify, from the article, a plurality of sections;

provide, to one or more GPT models, for each section of the plurality of sections of the article, a prompt including instructions to generate a section summary for the section based on one or more sentences included in the section, wherein providing the prompt to the one or more GPT models comprises the one or more processors to select the one or more GPT models from a plurality of GPT models based on the selected one or more GPT models providing higher metrics than non-selected GPT models, the metrics comprising at least two of:

a minimization of a classification score indicating a likelihood that the one or more sentences included in the section correspond to the section summary;

a minimization of processing time;

a minimization of a score indicating a duration a user associated with a client device is reading;

a minimization of a period of time associated with a reading time; and a minimization of words on a deny list included within the section summaries;

generate an article summary based on the section summary generated for each section;

determine, using the one or more GPT models, that a first portion of the article summary does not satisfy a validation criteria; and provide, for presentation at the client device, a document including the article summary and a first indicator corresponding to a first portion of the article.

25. The system of claim 24, comprising the one or more processors to:

determine, using a first classifier responsive to providing the prompt to generate the section summary for the section, that at least one sentence included in a section summary of a first section of the plurality of sections of the article has a classification score indicating that the at least one sentence belongs to a second section of the plurality of sections of the article;

remove the at least one sentence from the section summary of the first section to generate an updated section summary of the first section; and generate the article summary based on the section summary generated for each section and the updated section summary of the first section.

26. The system of claim 24, wherein to determine that the first portion does not satisfy the validation criteria, the one or more processors are configured to determine, from the article summary, a first concept found in the article summary that is missing from the article; and wherein the first indicator corresponds to the first concept.

27. The system of claim 24, wherein to determine that the first portion does not satisfy the validation criteria, the one or more processors are configured to determine, using a second classifier, for a first sentence included in the article summary, a confidence score indicating a likelihood that the first sentence is not supported by the article; and wherein the first indicator corresponds to the first sentence.

* * * * *